US011317713B2

(12) United States Patent
Miller et al.

(10) Patent No.: US 11,317,713 B2
(45) Date of Patent: *May 3, 2022

(54) DESK SYSTEM WITH EXPANDABLE BENCHING

(71) Applicant: Poppin, Inc., New York, NY (US)

(72) Inventors: Jeffrey Frederick Miller, New York, NY (US); Matteo Bonacina, New York, NY (US); Jason Caleb Zipperer, Brooklyn, NY (US); Adrian Gomez, Edgewater, NJ (US)

(73) Assignee: Poppin, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,182

(22) Filed: Oct. 29, 2020

(65) Prior Publication Data
US 2021/0045524 A1    Feb. 18, 2021

Related U.S. Application Data

(63) Continuation of application No. 16/354,861, filed on Mar. 15, 2019, now Pat. No. 10,842,259, which is a
(Continued)

(51) Int. Cl.
*A47B 13/00*    (2006.01)
*A47B 1/08*    (2006.01)
(Continued)

(52) U.S. Cl.
CPC .............. *A47B 13/003* (2013.01); *A47B 1/08* (2013.01); *A47B 3/06* (2013.01); *A47B 13/00* (2013.01);
(Continued)

(58) Field of Classification Search
CPC ........... A47B 13/088; A47B 2200/0013; F16B 2/185
(Continued)

(56) References Cited

U.S. PATENT DOCUMENTS 2,194,138 A    1/1940 Crawford
D164,075 S    7/1951 Wallance
(Continued)

FOREIGN PATENT DOCUMENTS

AU    2005200644 A1    9/2005
CN    1599843 A    3/2005
(Continued)

OTHER PUBLICATIONS

Series A Double Desk for 4, published as early as 2017, retrieved Nov. 7, 2019; https://poppin.com/Series-A-Double-Desk-for-4%2C-Charcoal-Legs-130594.html?dwvar_103594_color=white&cgid=desks (Year:2019), 5 pages.
(Continued)

*Primary Examiner* — Jose V Chen
(74) *Attorney, Agent, or Firm* — K&L Gates LLP

(57) ABSTRACT

A multipurpose desk system assembly and an associated method of assembling the desk system are disclosed. The desk system assembly may include a top panel assembly and a base support system configured with clamping devices for convenient assembly. The desk system assembly may comprise multiple top panel assemblies and can be configured to be readily converted or customized to fit the needs of an end user.

20 Claims, 29 Drawing Sheets

Related U.S. Application Data continuation of application No. 15/549,941, filed as application No. PCT/US2016/017872 on Feb. 12, 2016, now Pat. No. 10,231,537.

(60) Provisional application No. 62/116,308, filed on Feb. 13, 2015.

(51) Int. Cl.
*A47B 3/06* (2006.01)
*A47B 13/08* (2006.01)
*F16B 2/18* (2006.01)

(52) U.S. Cl.
CPC ............ *A47B 13/088* (2013.01); *F16B 2/185* (2013.01); *A47B 2200/0013* (2013.01)

(58) Field of Classification Search
USPC ......... 108/64, 157.18, 159.11, 158.11, 153.1
See application file for complete search history.

(56) References Cited

U.S. PATENT DOCUMENTS

| | | | |
|---|---|---|---|
| 2,871,075 | A | 1/1959 | Stone |
| 2,932,873 | A | 4/1960 | Reichert |
| 3,295,475 | A | 1/1967 | McClellan |
| 3,463,099 | A | 8/1969 | Doucette |
| 3,742,869 | A | 7/1973 | Polsky et al. |
| 4,382,642 | A | 5/1983 | Burdick |
| D287,680 | S | 1/1987 | Lonngren |
| 4,646,398 | A | 3/1987 | Myhrman |
| 4,679,510 | A | 7/1987 | Veyhl et al. |
| 4,786,022 | A | 11/1988 | Grieshaber |
| 4,838,181 | A | 6/1989 | Luyk |
| D308,444 | S | 6/1990 | Birdick |
| 4,944,235 | A | 7/1990 | Jahnke et al. |
| 4,974,913 | A | 12/1990 | Vogt et al. |
| 5,078,055 | A | 1/1992 | Bellini et al. |
| 5,144,888 | A | 9/1992 | Heine et al. |
| 5,277,132 | A * | 1/1994 | Korb ...................... A47B 17/00 108/64 |
| 5,323,713 | A | 6/1994 | Luyk et al. |
| 5,351,368 | A | 10/1994 | Borst |
| 5,490,467 | A | 2/1996 | Diffrient |
| D371,703 | S | 7/1996 | Muller-Deisig et al. |
| 5,549,055 | A | 8/1996 | Krsch |
| 5,598,790 | A | 2/1997 | Fich |
| 5,662,298 | A | 9/1997 | Collins |
| 5,666,888 | A | 9/1997 | Dame et al. |
| D386,631 | S | 11/1997 | Meier et al. |
| 6,279,489 | B1 | 8/2001 | Daniel |
| 6,283,043 | B1 | 9/2001 | Stern et al. |
| 6,302,035 | B1 | 10/2001 | Frankler |
| 6,450,107 | B1 | 9/2002 | Sanz Novales |
| 6,474,246 | B2 | 11/2002 | Hsu |
| 6,527,473 | B2 | 3/2003 | Chen |
| D479,063 | S | 9/2003 | Juneau |
| D484,717 | S | 1/2004 | de Blois |
| 6,725,784 | B2 | 4/2004 | Crinion |
| D501,103 | S | 1/2005 | Ashby et al. |
| D503,298 | S | 3/2005 | Juneau |
| 6,984,066 | B2 | 1/2006 | Borom |
| 7,308,858 | B2 | 12/2007 | Lo et al. |
| 7,765,937 | B2 | 8/2010 | Weissenrieder et al. |
| 7,798,070 | B2 | 9/2010 | Ooba et al. |
| D647,324 | S | 10/2011 | Kincaid et al. |
| D662,336 | S | 6/2012 | Martin et al. |
| 8,196,525 | B2 | 6/2012 | Flanet |
| 8,291,833 | B2 | 10/2012 | Skiba |
| 8,347,796 | B2 | 1/2013 | Udagawa et al. |
| D684,799 | S | 6/2013 | Kong et al. |
| D717,572 | S | 11/2014 | Morrison |
| 8,960,106 | B2 | 2/2015 | Kumazawa |
| D732,852 | S | 6/2015 | Park et al. |
| D734,630 | S | 7/2015 | Bolton et al. |
| 9,089,209 | B2 | 7/2015 | Malthai et al. |
| 9,095,209 | B2 | 8/2015 | Mirth et al. |
| 9,174,077 | B2 | 11/2015 | Lim |
| D770,205 | S | 11/2016 | Lin |
| D772,621 | S | 11/2016 | Levy |
| D772,623 | S | 11/2016 | Lin |
| D775,876 | S | 1/2017 | Gaschy |
| D779,500 | S | 2/2017 | Miller et al. |
| D781,085 | S | 3/2017 | Liu |
| D782,228 | S | 3/2017 | Gharabegian |
| 9,635,930 | B2 | 5/2017 | Korb et al. |
| 9,706,840 | B2 | 7/2017 | Tsuchiyama et al. |
| D799,248 | S | 10/2017 | Miller et al. |
| D801,092 | S | 10/2017 | Merritt |
| D808,204 | S | 1/2018 | Davis et al. |
| 9,943,954 | B2 | 4/2018 | Bryant |
| 10,231,537 | B2 * | 3/2019 | Miller ...................... A47B 3/06 |
| D845,046 | S | 4/2019 | Velez |
| D851,432 | S | 6/2019 | Salto |
| 10,842,259 | B2 * | 11/2020 | Miller ...................... A47B 3/06 |
| 2003/0010260 | A1 | 1/2003 | Chang |
| 2005/0105963 | A1 | 5/2005 | Maniezzo |
| 2008/0294745 | A1 | 12/2008 | Hamilton et al. |
| 2010/0192812 | A1 | 8/2010 | Yul et al. |
| 2011/0290159 | A1 | 12/2011 | Saito |
| 2012/0000402 | A1 | 1/2012 | Jimenez Mangas et al. |
| 2013/0319296 | A1 | 12/2013 | Lio et al. |
| 2018/0020822 | A1 | 1/2018 | Miller et al. |
| 2019/0341967 | A1 | 11/2019 | Zdeblick |
| 2020/0046112 | A1 | 2/2020 | Miller et al. |

FOREIGN PATENT DOCUMENTS

| | | |
|---|---|---|
| DE | 9201549 U1 | 3/1992 |
| DE | 29914651 U1 | 11/1999 |
| EP | 0707807 A3 | 8/1996 |
| FR | 2659400 B1 | 8/1992 |
| GB | 2417288 A | 2/2006 |
| WO | 03048588 A1 | 6/2003 |
| WO | 2013157777 A1 | 10/2013 |
| WO | 2016130995 A1 | 8/2016 |

OTHER PUBLICATIONS

International Search Report and Written Opinion for International PCT Application No. PCT/US2016/017872, dated May 2, 2016.
Supplemental European Search Report and Written Opinion for European Patent Application No. 16750019, dated Aug. 28, 2018.

* cited by examiner

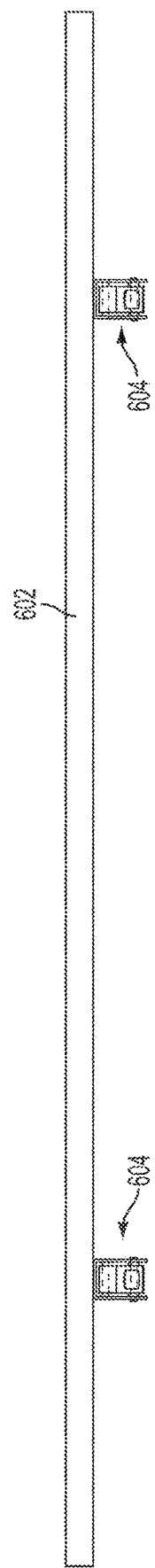

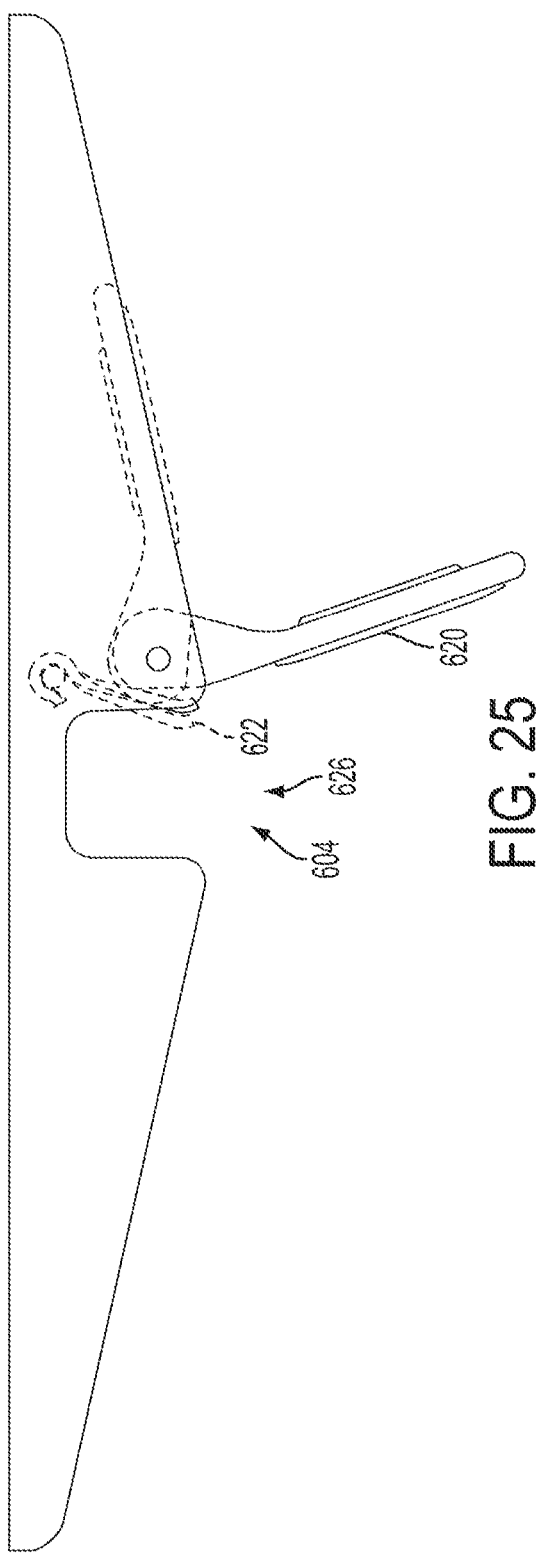

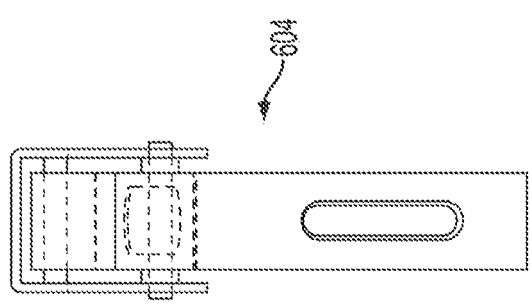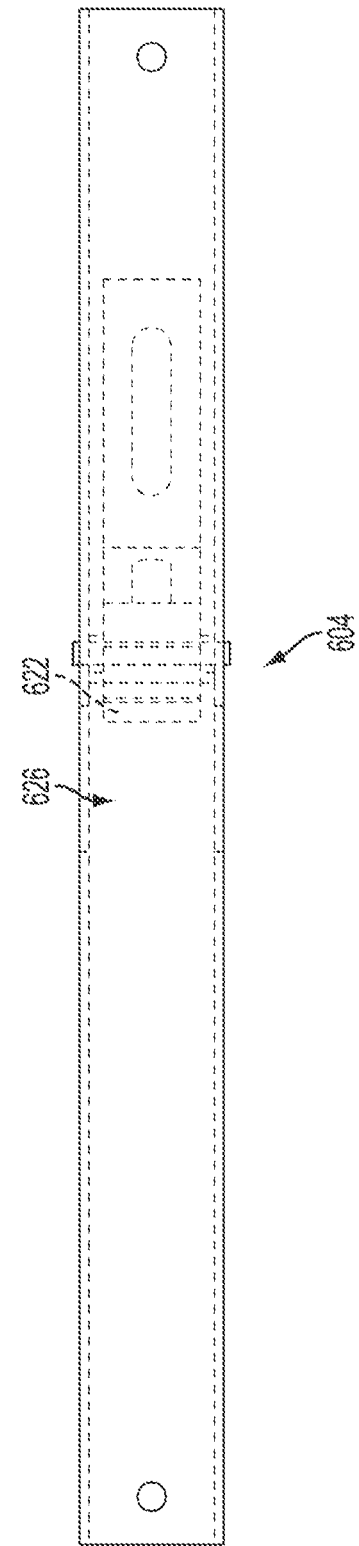

DESK SYSTEM WITH EXPANDABLE BENCHING

CROSS-REFERENCE TO RELATED APPLICATIONS

This application is a continuation application claiming priority under 35 U.S.C. § 120 to U.S. patent application Ser. No. 16/354,861, entitled DESK SYSTEM WITH EXPANDABLE BENCHING, filed Mar. 15, 2019, which is a continuation application claiming priority under 35 U.S.C. § 120 to U.S. patent application Ser. No. 15/549,941, entitled DESK SYSTEM WITH EXPANDABLE BENCHING, filed Aug. 9, 2017, now U.S. Pat. No. 10,231,537, issued Mar. 19, 2019, which is a U.S. National Stage Entry under 35 U.S.C. § 371 of International Patent Application No. PCT/US2016/017872, entitled DESK SYSTEM WITH EXPANDABLE BENCHING, filed Feb. 12, 2016, which claims the benefit of priority under 35 U.S.C. § 119 (e) to U.S. Provisional Patent Application Ser. No. 62/116,308, entitled DESK SYSTEM WITH EXPANDABLE BENCHING, filed Feb. 13, 2015, the entire disclosures of which are hereby incorporated by reference herein in their respective entireties.

CROSS REFERENCE TO PENDING APPLICATIONS

This application is related to U.S. patent application Ser. No. 14/477,194, entitled MULTIPURPOSE TABLE INCLUDING CONCEALED STORAGE TRAY, filed on Sep. 4, 2014, the entire disclosure of which is incorporated by reference herein.

BACKGROUND

Many currently available desks used in offices or workplace environments are designed for a unitary purpose and often limited in utility and appearance. These desks may be of fixed dimensions and provide the user with very little ability to customize their office of workspace. In addition, these desks often require substantial time to be assembled. Unfortunately, such desks typically do little or nothing to enhance the work environment and can often present ergonomic challenges in designing a comfortable and healthy workspace. Enhanced desks are needed that blend functionally, utility, and aesthetics to optimize the workspace.

Many currently available desk systems present difficulties for users. Such problems can arise in the form of the mode of shipment and assembly of a desk system, for example. In an attempt to reduce shipping costs, desk systems may be designed with numerous pieces which require the end user to meticulously assemble the desk system. The assembly process often requires special tools and can be time intensive. Also, many times the assembly process relies on having assistance from multiple individuals to properly assemble the desk system.

Another problem many currently available desk systems present for users is their lack of multifunctionality. Often, in an attempt to reduce manufacturing costs, desk systems are manufactured in a limited number of options and configurations. The purchaser is left with minimal options for customization and optimization of the workspace.

What are needed, therefore, are improved techniques, tools, and devices for simplifying the assembly process for desk systems and other types of furniture, for reducing the need for special assembly tools, for reducing the amount of time needed to assemble a desk system, and for improving the shipment process for delivering a desk system to an end user. Furthermore, multifunctional desk systems are needed that provide the user with customization options while maintaining manufacturing efficiencies.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIG. 24 is a side view of the top panel assembly depicted in FIG. 22;

FIG. 25 illustrates a front view of an example of a top panel assembly attachment mechanism;

FIG. 26 illustrates a side view of the top panel assembly attachment mechanism depicted in FIG. 25;

FIG. 27 illustrates a bottom view of the top panel assembly attachment mechanism depicted in FIG. 25;

DESCRIPTION

Figure 1:
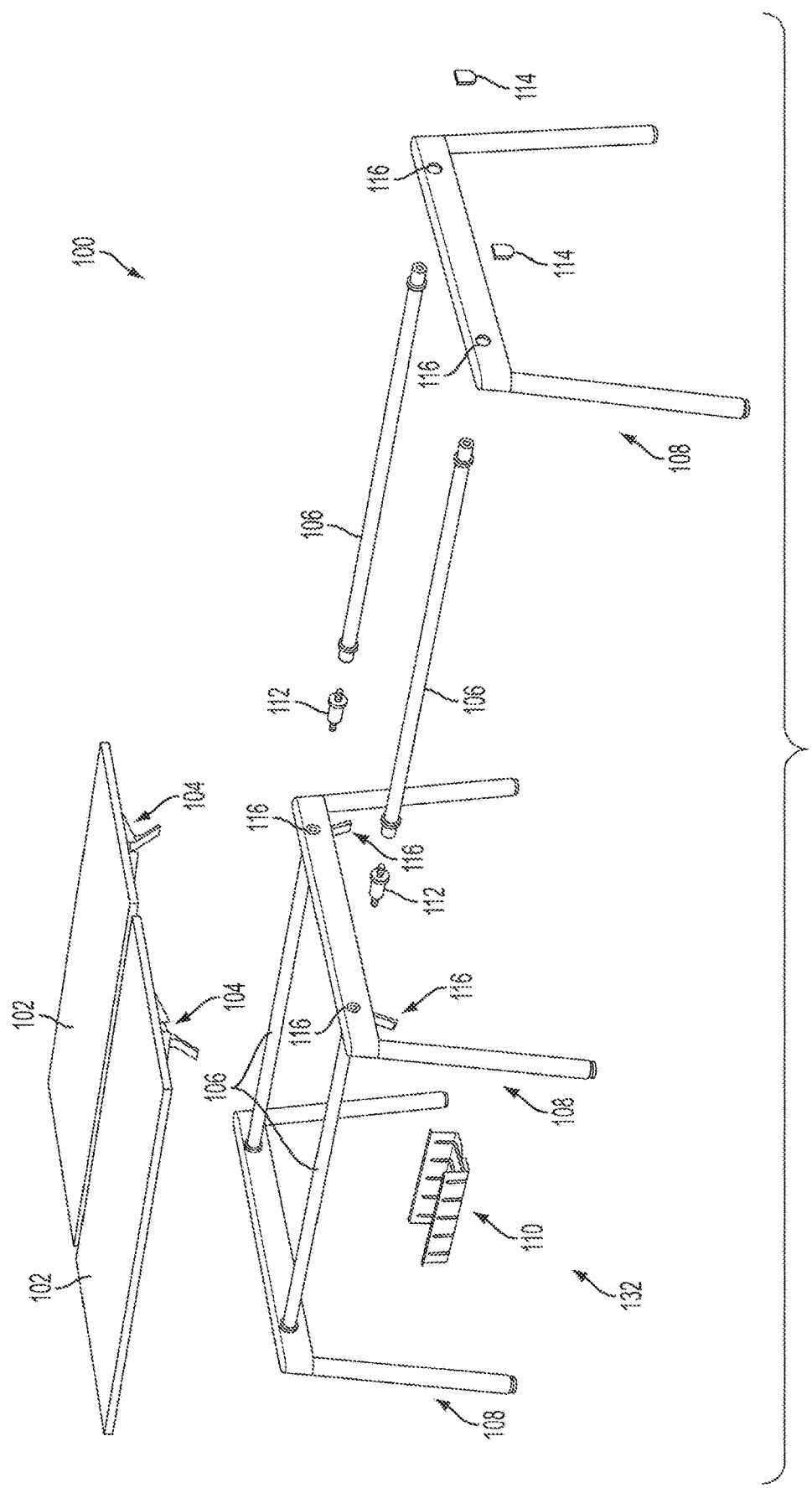
FIGS. 1 through 7 illustrate exploded views of an example of a desk system assembly and an example of assembling the desk system.

In various embodiments, the present invention embraces the notion that there is a need for a desk system that provides users with an easy and efficient means for assembly. The inventors have addressed the need for assembly of a desk system to be minimally time consuming and not require the use of additional tools, special tools, or excessive hardware for the assembly process.

Different embodiments of the present invention offer a desk system assembly including a concealed and readily accessible accessory basket/storage tray that can be used to retain materials (e.g., phones, projectors, cables, power cords, controls, notepads, pens, etc.), or many other items or devices. In assembly and use, the desk system can be customized or changed to meet the specific needs of the user. The desk system assembly can be assembled for a single user, or can easily be configured for expansion to accommodate multiple users in an open workspace environment. In this manner, various embodiments of the invention provide the capability to expand or adjust a workspace as the needs of its workers change over time.

FIGS. 1-7 illustrate an example of a desk system assembly 100, and a method of assembling the assembly 100. The assembly 100 may include at least one top panel assembly 102 comprising at least one top panel clamp 104. The assembly 100 further comprises a leg support 108 and a cross beam support 106 which comprise a base support system 132. The assembly 100 may comprise an accessory basket 110, one or more cross beam spacers 112, and one or more cross beam covers 114. In certain embodiments, the assembly 100 may further comprise one or more leg clamp assemblies 116.

FIG. 1 depicts the desk system assembly 100 in an exploded state for purposes of illustration. In the example shown, the assembly 100 is configured to be assembled without the need for additional or special tools and is configured to be assembled in a short period of time. The top panel assembly 102, cross beam supports 106 and leg supports 108 comprise structural components of the assembly 100 which can be assembled in an efficient manner without the use of additional tools.

FIG. 1 depicts the base support system 132 of a double desk system in an assembled state. However, the assembly methods discussed herein are applicable to the expansion of an already assembled desk system and/or the assembly of a desk system assembly from unassembled components. The assembly of the desk system assembly 100 may first involve the assembly of the base support system 132. For a double desk system (two double desk systems are shown in combination in FIGS. 1-7), two leg supports 106 and two cross beam supports 106 may be used. First a cross beam support 106 is inserted into the corresponding leg clamp assemblies 116. When extending the assembly 100, as shown in FIGS. 1-7, the use of a cross beam spacer 112 may be involved. The cross beam spacers 112 can be configured to connect two longitudinally positioned cross beams 106 so that the assembly 100 can be expanded longitudinally. Each end of the cross beam support 106 is inserted into an opposing leg clamp assembly 116. Where the use of a cross beam spacer 112 is involved, the cross beam spacer 112 is attached to the opposing end of the cross beam support 106 and attached to the cross beam support 106 within the leg clamp assembly 116 of the base support system 132.

Figure 2:
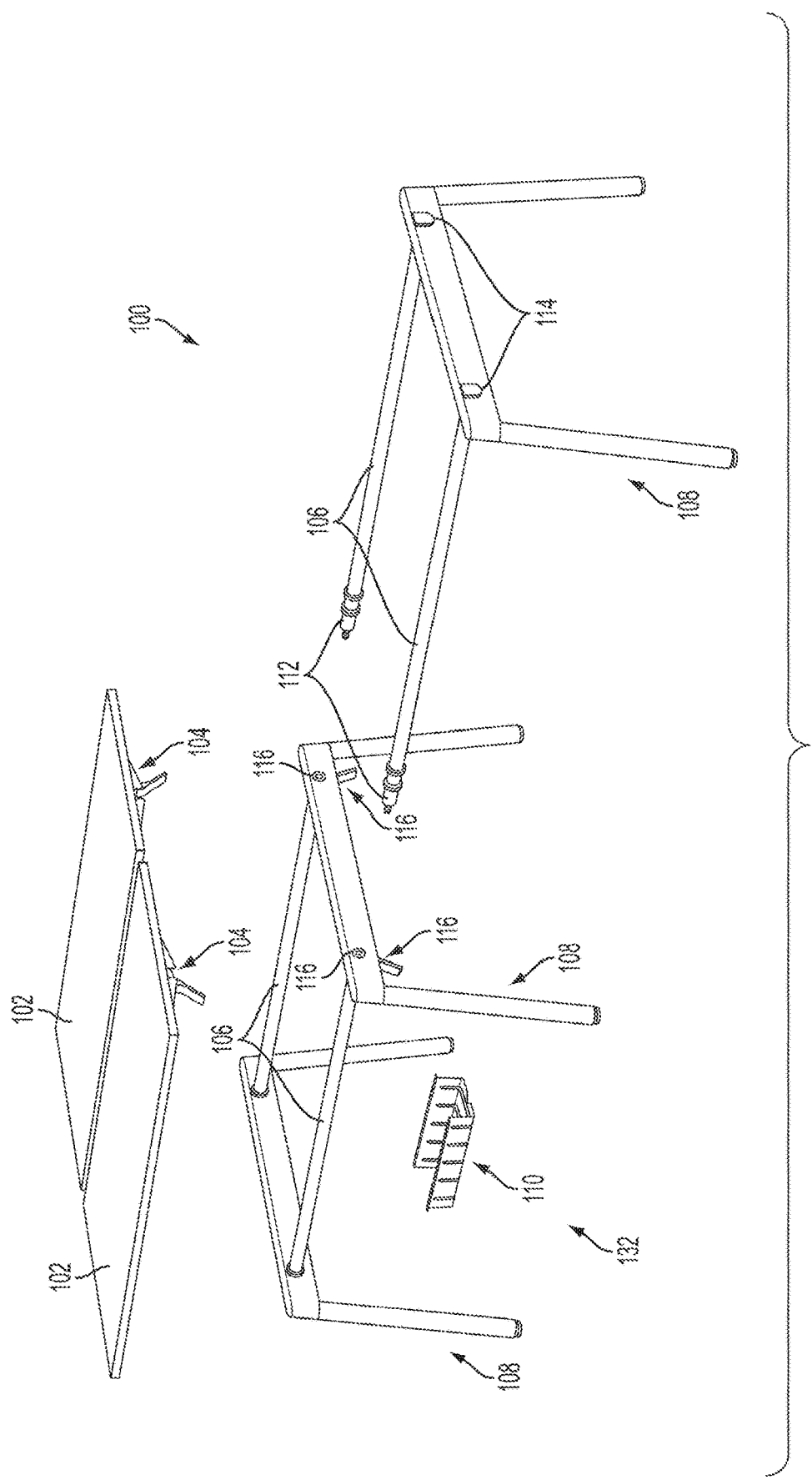
Figure 3:
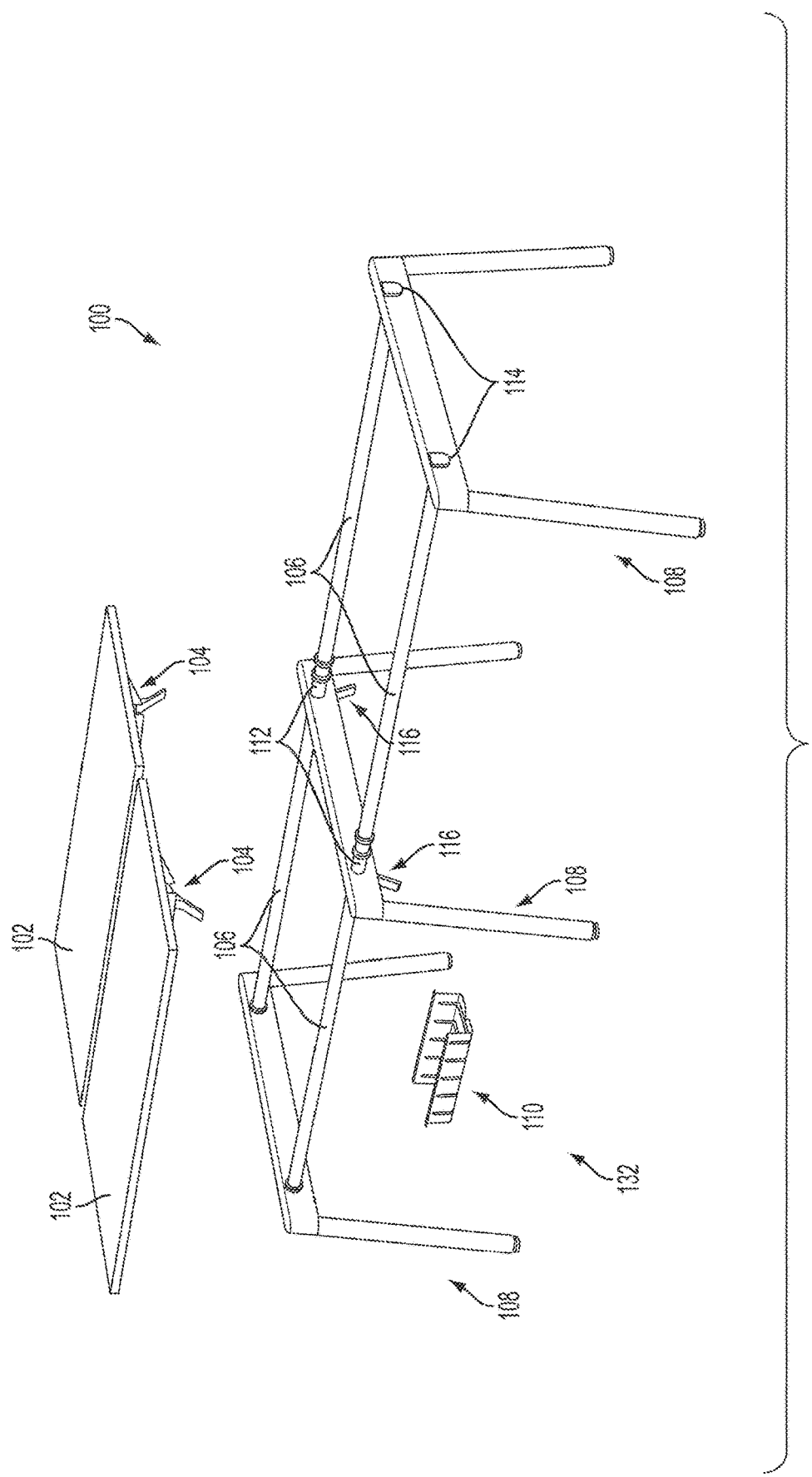

With reference to FIGS. 2 and 3, the cross beam supports 106 can be inserted into the leg clamp assembly 116 of the leg supports 108 and the cross beam spacers 112 can be attached to the opposing end of the cross beam supports 106. The attached cross beam spacers 112 are then inserted into opposing leg clamp assemblies 116 of the base support system 132. Once the cross beam supports 106 are inserted into the leg clamp assembly 116, and the leg clamp assembly 116 is actuated to clamp and lock the cross beam support 106 in place, the cross beam covers 114 may be attached to the opposite side of the leg clamp assembly 116. The cross beam covers 114 may provide an aesthetically pleasing appearance to the base support system 132, while resisting dirt and debris from entering the leg clamp assembly 116 and potentially causing the leg clamp assembly 116 to jam, bind, or otherwise malfunction during use.

Figure 4:
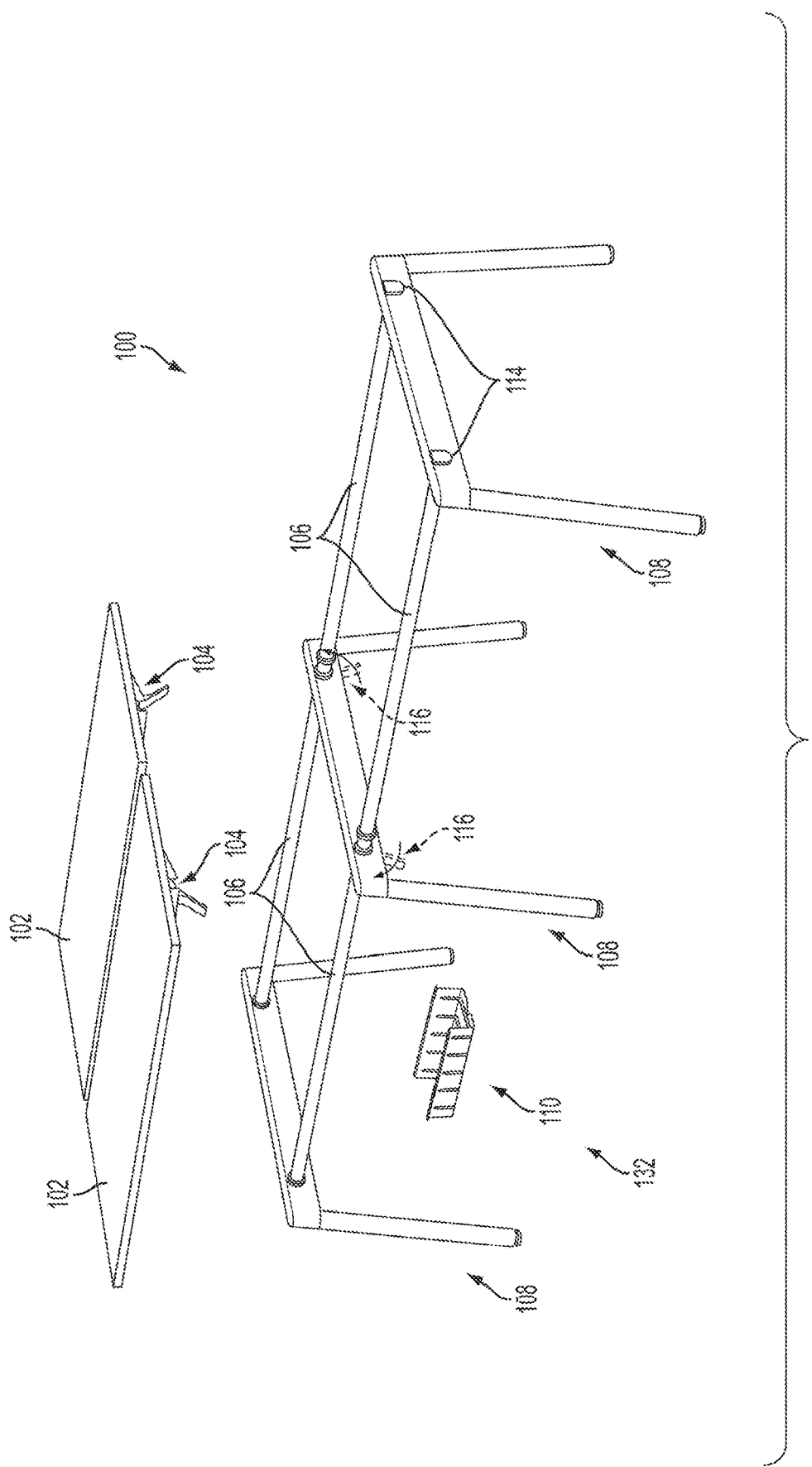
Figure 5:
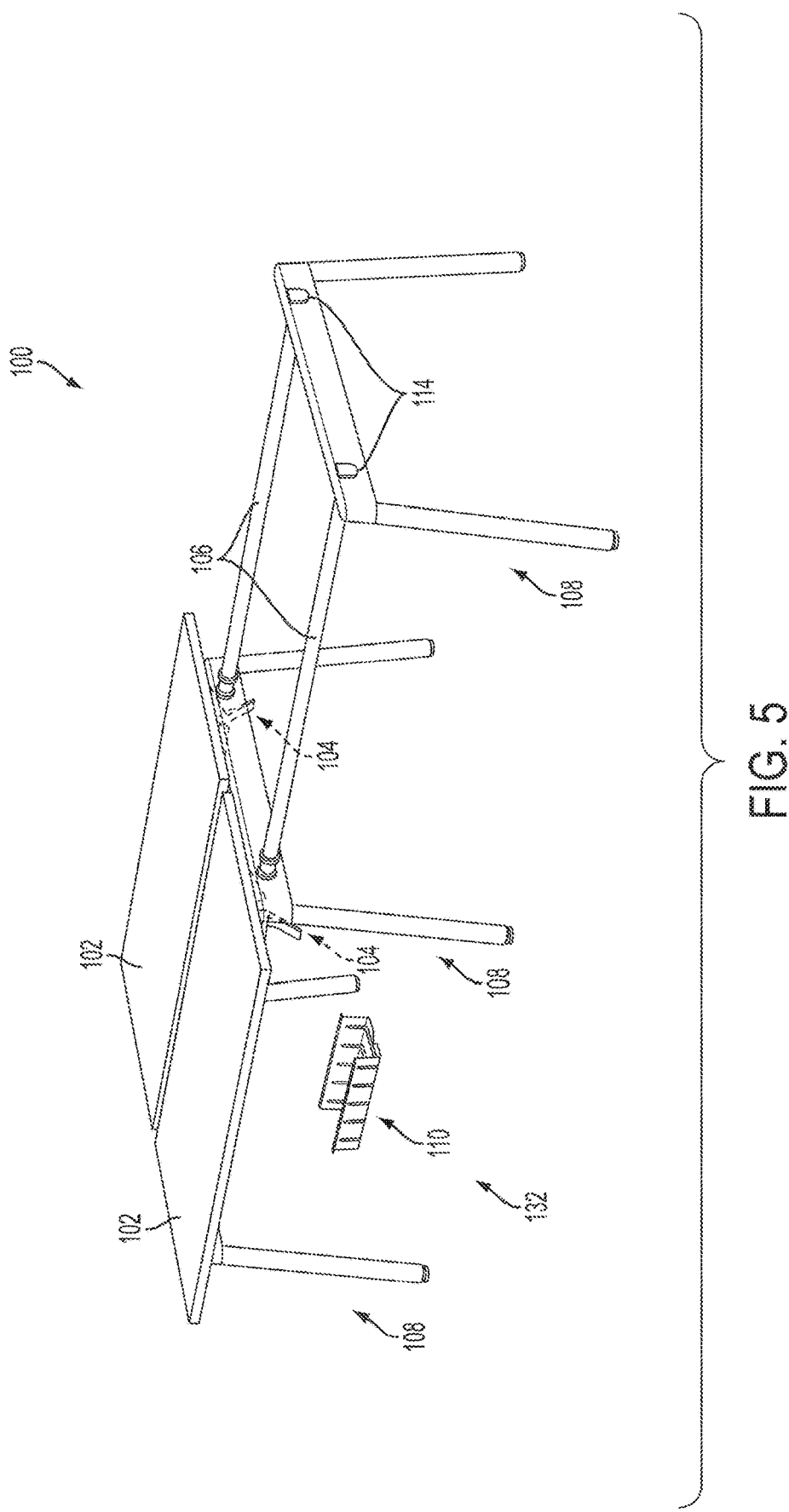

FIG. 4 depicts the closing of the leg clamp assembly 116 following the insertion of the cross beam support 108 into the leg clamp assemblies 116. The leg clamp assemblies 116 may be actuated between the open position and a closed position to securely and quickly lock the base support system 132 together. Once the base support system 132 is assembled, the top panel assemblies 102 may be attached. Each top panel assembly 102 comprises a top panel clamp assembly 104 configured to quickly and securely attach the top panel assembly 102 to the base support system 132. Each top panel assembly 102 is placed on top of the assembled base support system 132 wherein the top panel clamp assembly 102, which may be centrally located on the top panel assembly 102, is configured to engage the cross beam support 106. The mechanisms of the top panel clamp assembly 102 and the leg clamp assembly 116 will be discussed in further detail below.

Figure 6:
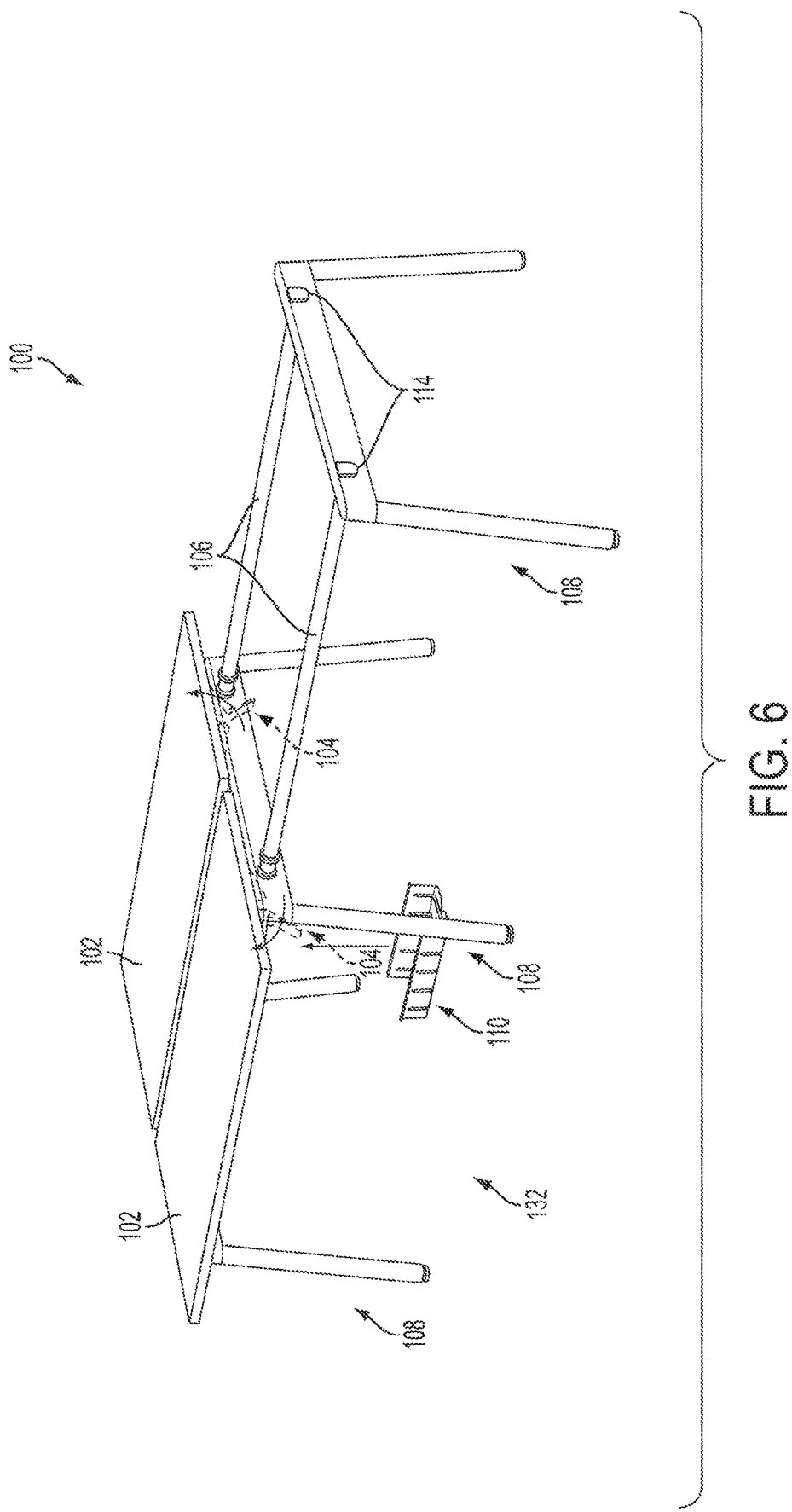
Figure 7:
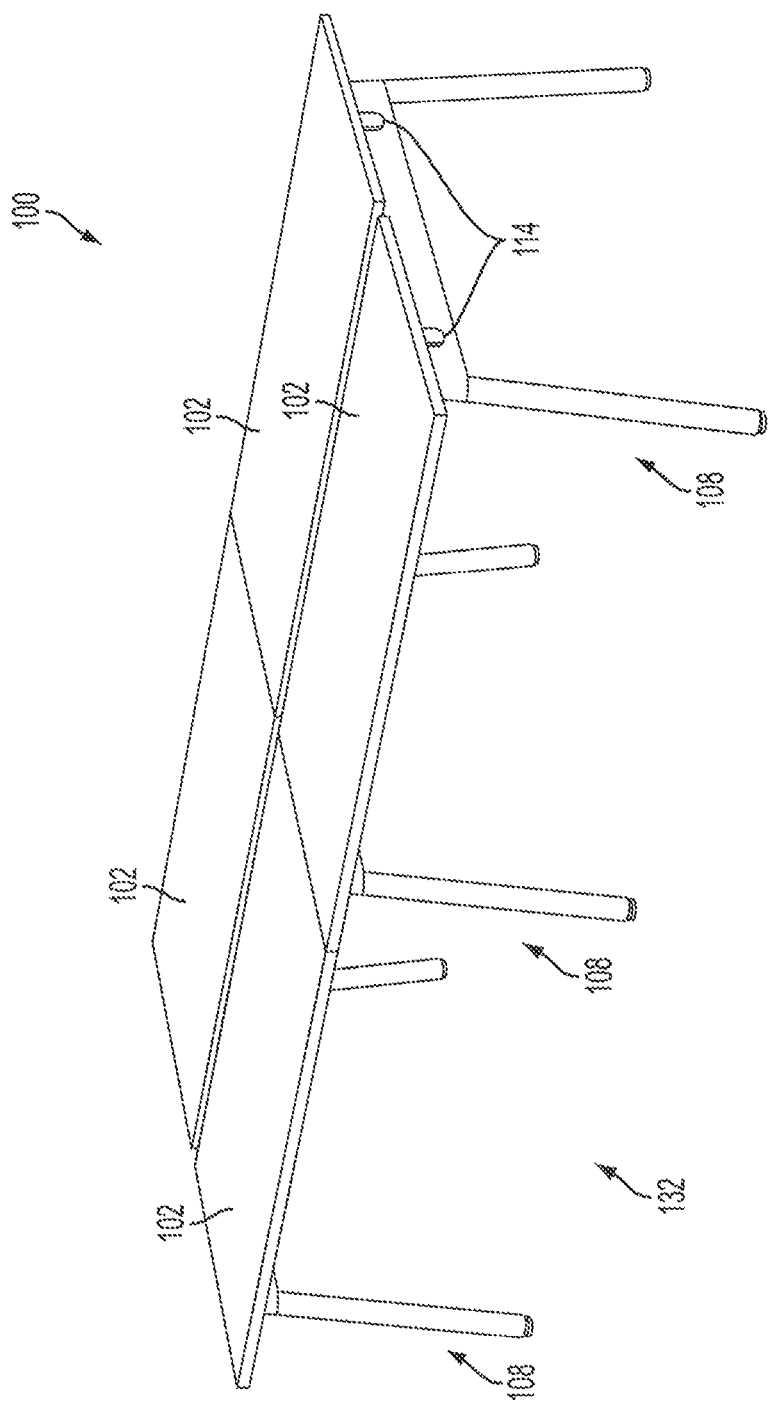
Figure 8:
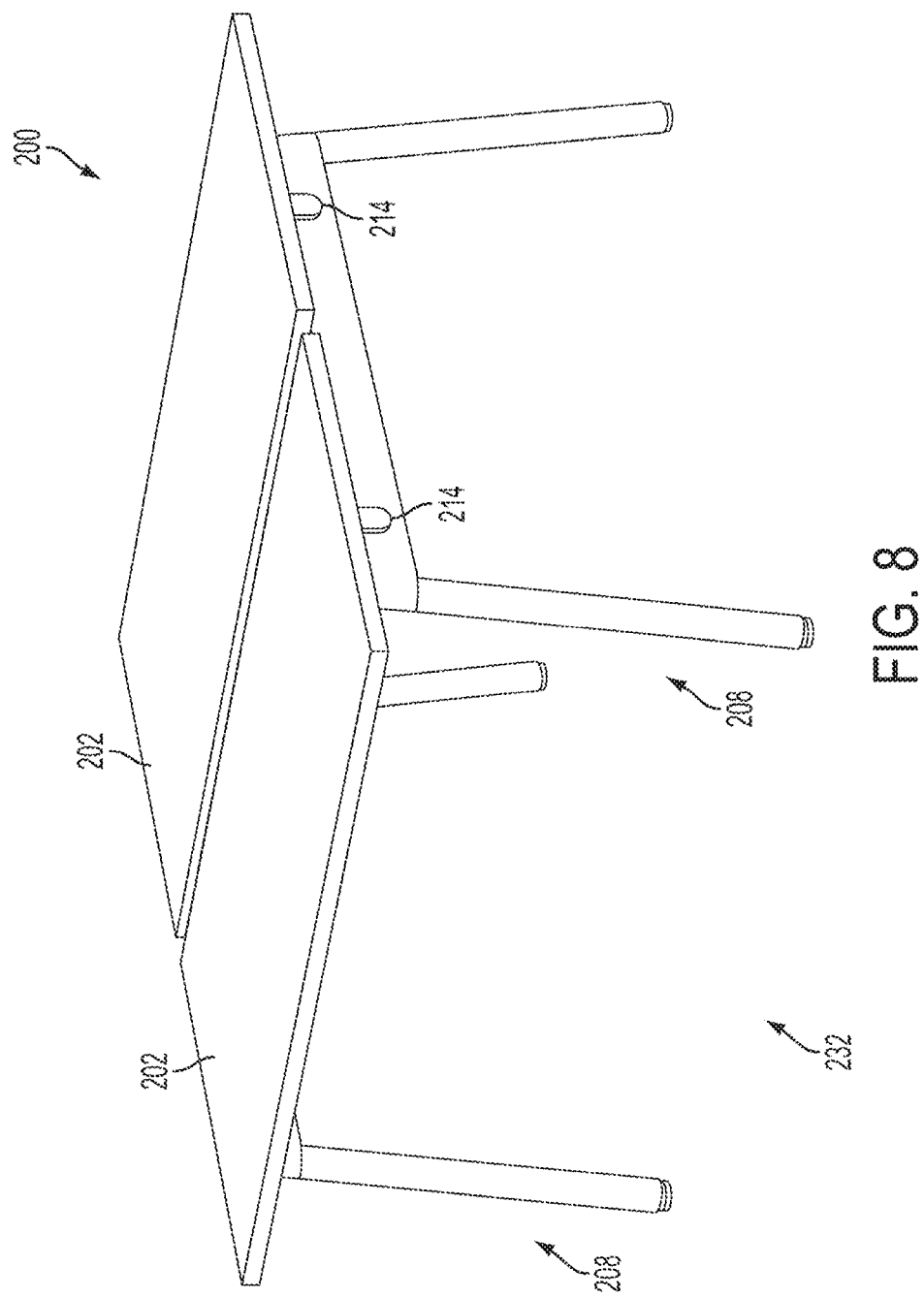
FIG. 8 illustrates a perspective view of an example of a double top desk.
Figure 9:
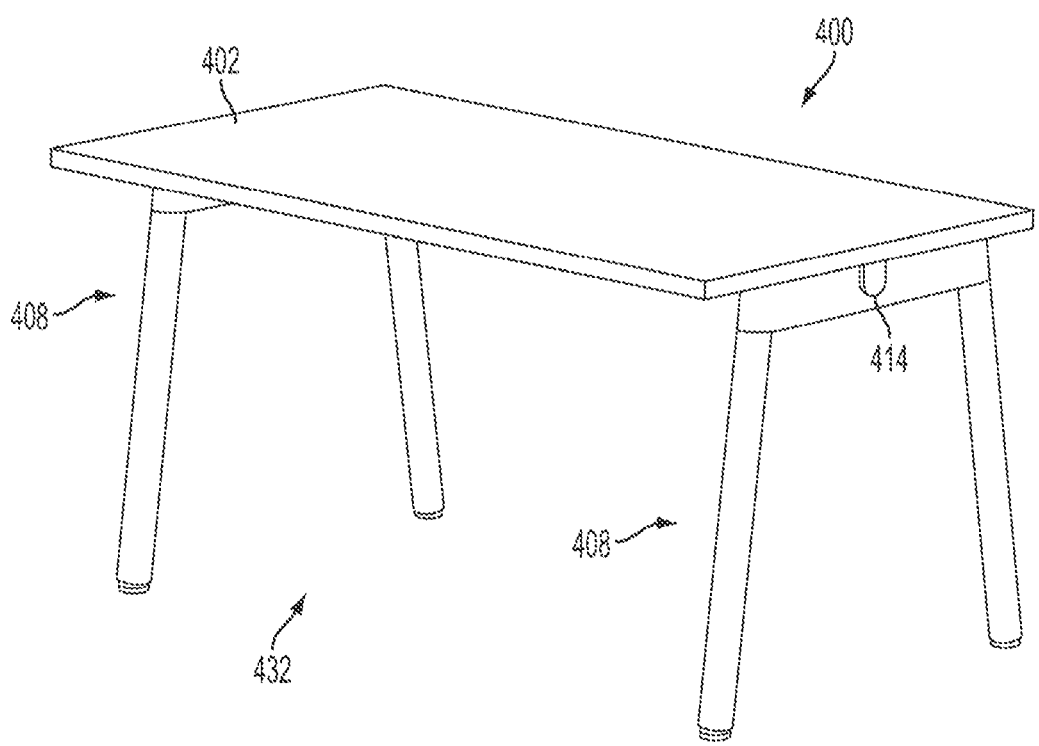
FIG. 9 illustrates a perspective view of an example of a single top desk.

Once the top panel assembly 102 is in place, the top panel clamp assembly 116 may be actuated to securely and quickly attach the top panel assembly 102 to the base support system 132. As shown in FIG. 6, once the top panel assembly 102 is securely in place, the accessory basket 110 may be attached to the bottom of the top panel assembly 102 and securely snapped or fastened in place. The accessory basket 110 can configured to snapingly fit within accessory rails/channels of two adjacent top panel assemblies 102. For example, the accessory basket 110 may be tension mounted in the accessory rails/channels of two adjacent top panel assemblies 102. As shown in FIG. 7, two completed double desk top desk systems are illustrated as completely assembled. While the method discussed above for purposes of illustration was directed toward the assembly of multiple top panel assembly desk system assemblies, the methods provided herein can be similarly applied to single and double desk system assemblies.

FIGS. 8 and 10-12 depict different views of an example of a double top desk system assembly 200 having an angled leg support 208. The double top desk system assembly 200 comprises two top panel assemblies 202 and two leg supports 208. The assembly of the desk system assembly 200 is similar to the assembly methods discussed above with regard to the assembly 100. The assembly 200 with angled leg support 208 comprises top panel clamp assemblies 204, cross beam supports 206, an accessory basket 210, cross beam support covers 214, leg clamp assemblies 216, and an accessory rail/channel 218. The accessory rail/channel 218 can be configured to receive and accept the accessory basket 210 in a friction fit, snap fit, or with other fastening method or apparatus. The accessory basket 210 can be configured to snapingly fit within accessory rails/channels 218 of two adjacent top panel assemblies 202. For example, the accessory basket 210 may be tension mounted in the accessory rails/channels 218 of two adjacent top panel assemblies 202. The accessory rail/channel 218 can be further configured to secure cables and other ancillary items that the user may wish to attach to the assembly 200.

Figure 10:
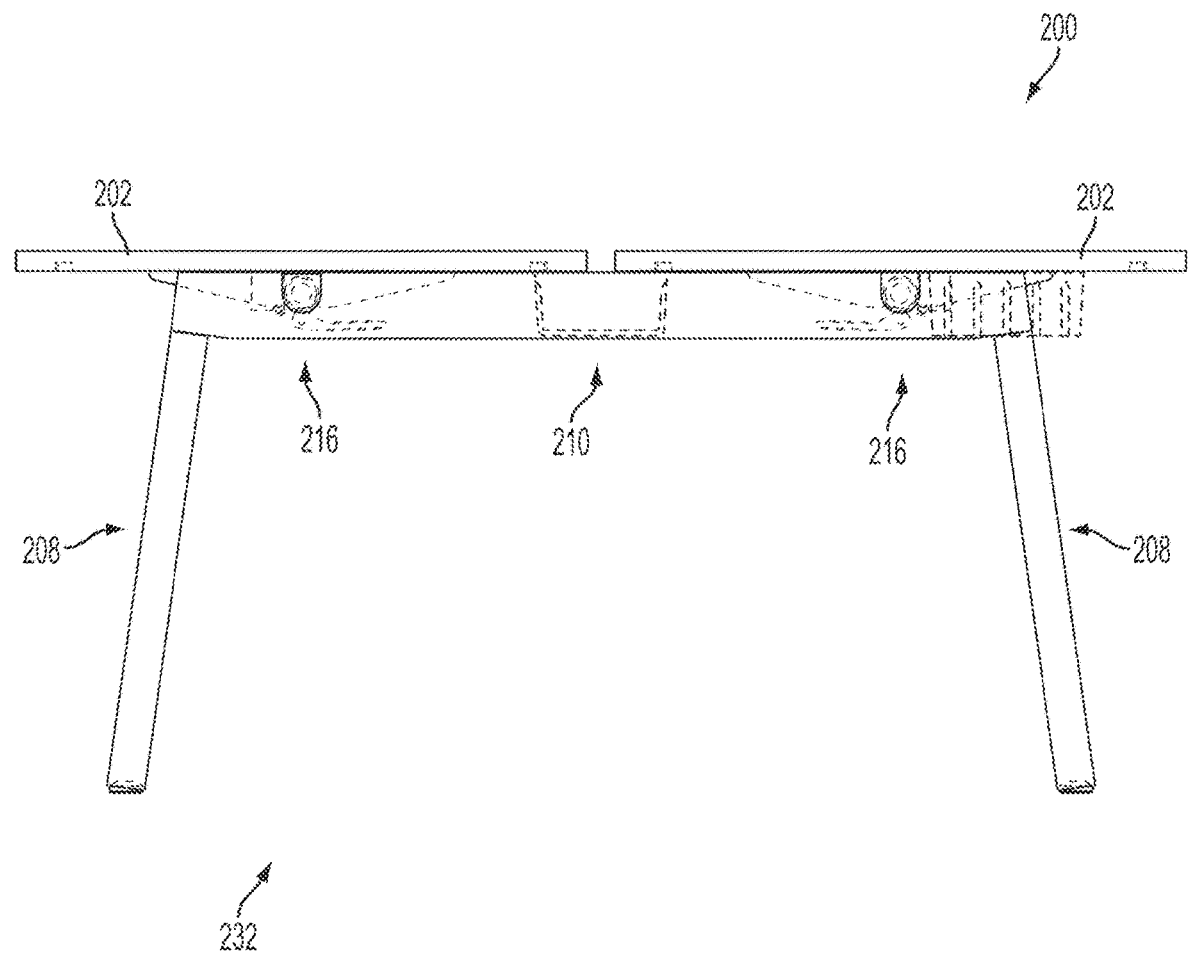
FIG. 10 illustrates a front view of the double top desk depicted in FIG. 8 having an example of a leg clamp assembly.
Figure 11:
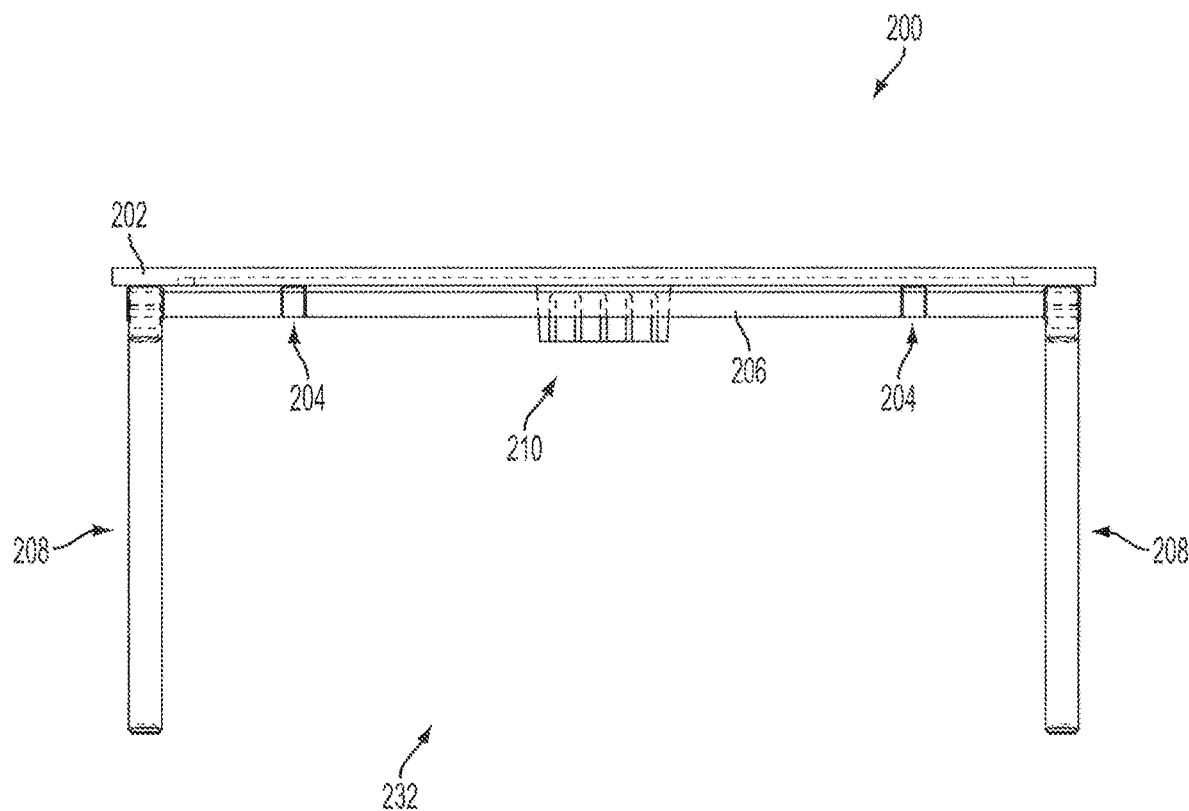
FIG. 11 illustrates a side view of the double top desk depicted in FIG. 8.
Figure 12:
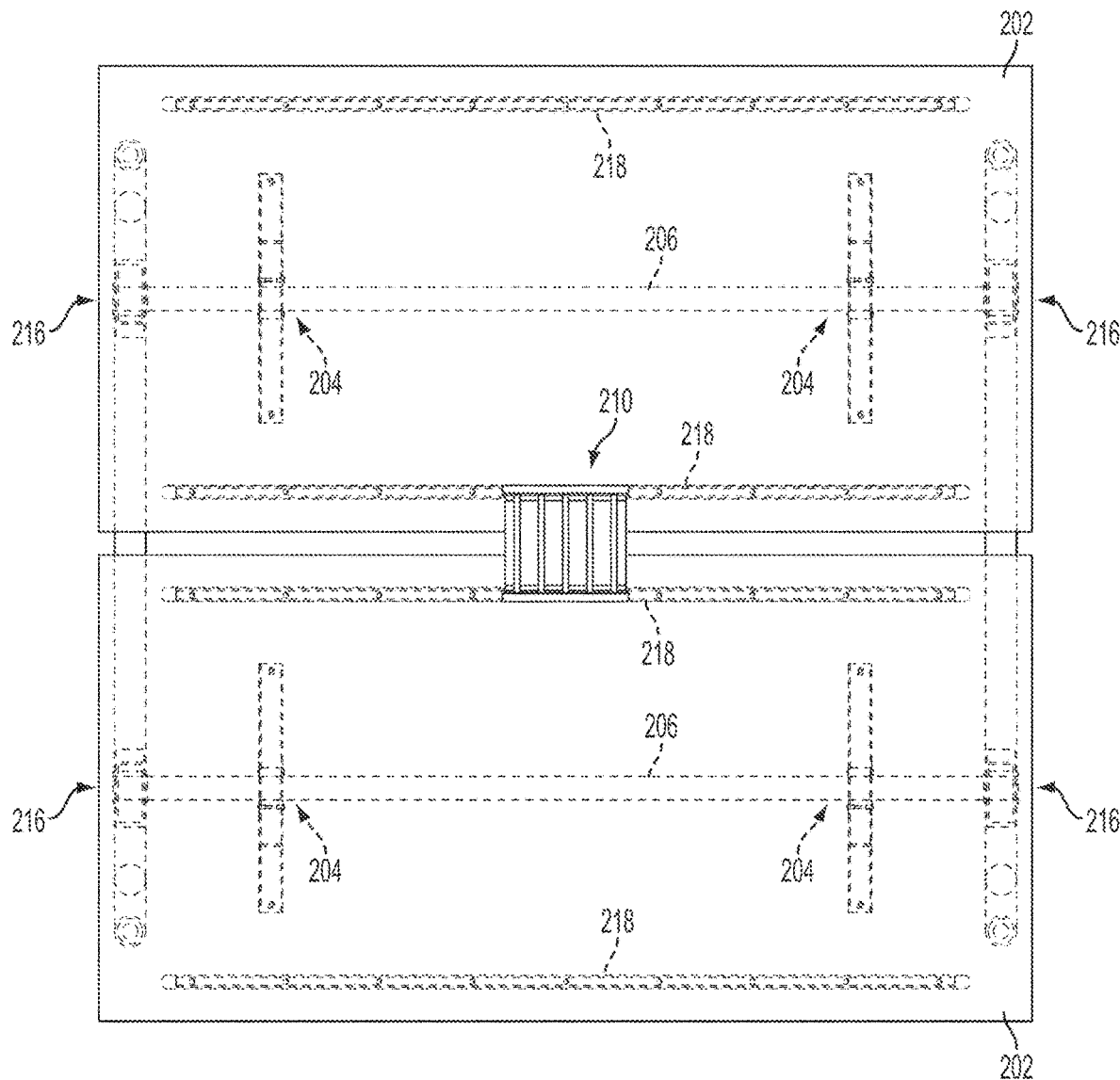
FIG. 12 illustrates a bottom view of the double top desk depicted in FIG. 8.

FIG. 10 depicts examples of leg clamp assemblies 216. The leg clamp assemblies 216 employ a camming mechanism to cam a secondary member into a camming relationship with the cross beam supports to hold the cross beam supports 206 in proper alignment and position.

Figure 13:
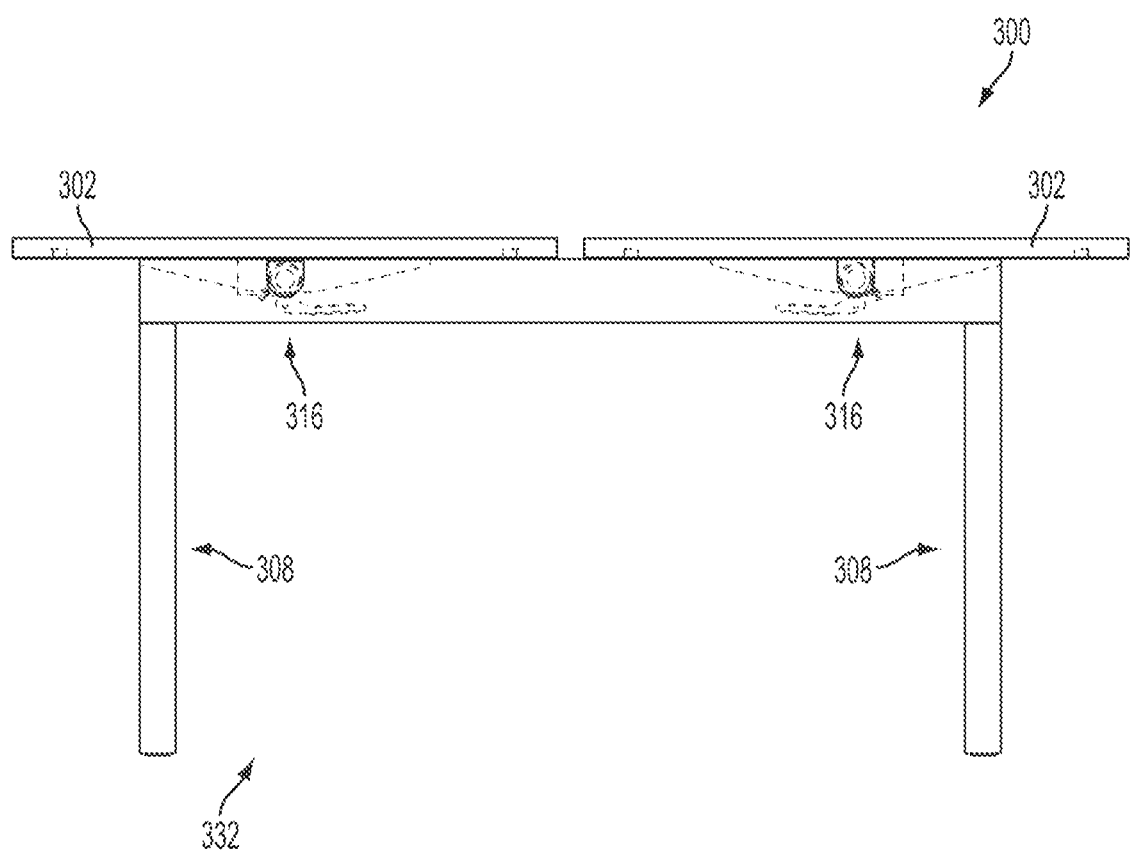
FIG. 13 illustrates a front view of an example of a double top desk including vertical legs having an example of a leg clamp assembly.
Figure 14:
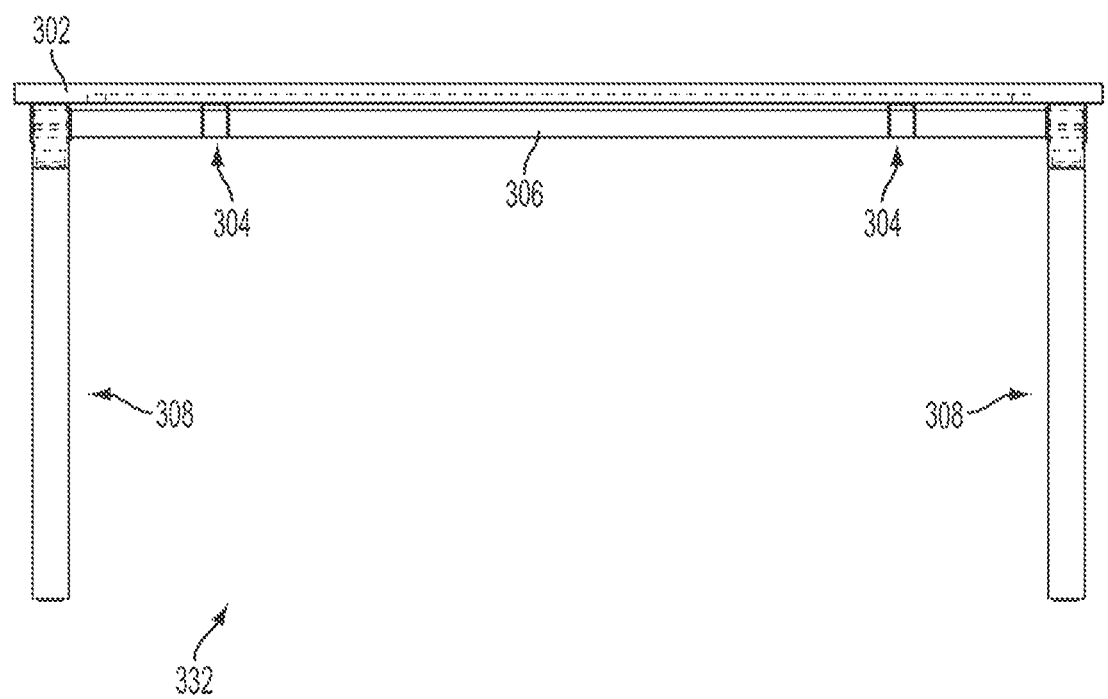
FIG. 14 illustrates a side view of a double top desk including vertical legs as depicted in FIG. 13.
Figure 15:
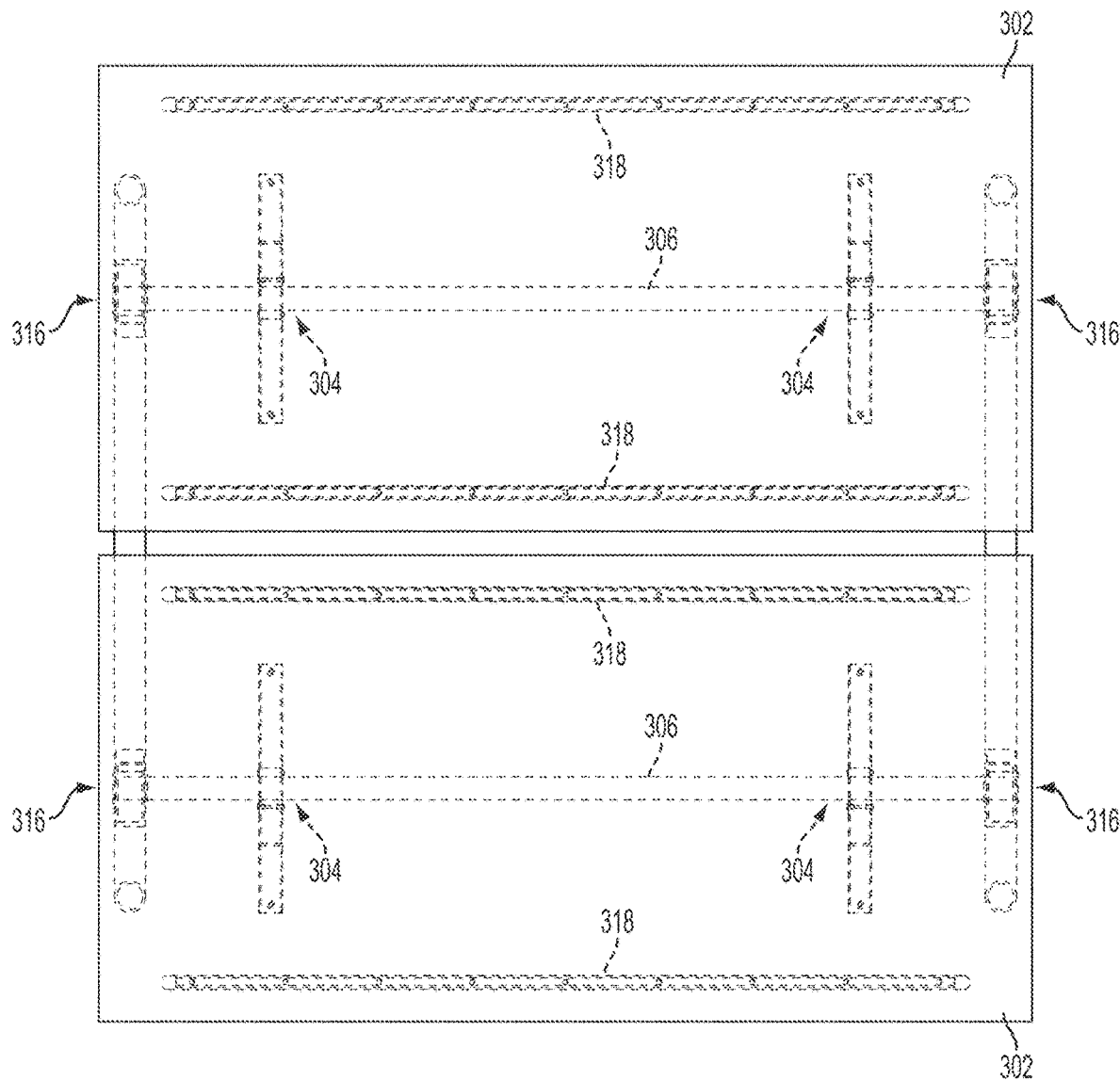
FIG. 15 illustrates a bottom view of a double top desk including vertical legs as depicted in FIG. 13.

FIGS. 13-15 depict different views of a double top desk system assembly 300 having generally vertical leg supports 308. The double top desk system assembly 300 comprises two top panel assemblies 302 and two vertical leg supports 308. The method of assembling the assembly 300 may be similar to the methods discussed above. The double top desk system assembly 300 with vertical leg support 308 comprises top panel clamp assemblies 304, cross beam supports 306, cross beam support covers 314, leg clamp assemblies 316, and an accessory rail/channel 318. The accessory rail/channel 318 can be configured to receive and accept an accessory basket in a friction fit, snap fit, or with other fastening method or apparatus. The accessory rail/channel 318 can be further configured to secure cables and other ancillary items that the desk user may wish to attach. The vertical leg configuration provides for unique aesthetics while reducing the footprint of the base support system 332.

FIG. 13 depicts examples of leg clamp assemblies 316. The leg clamp assemblies 316 employ a camming mechanism to cam a secondary member into a camming relationship with the cross beam supports to hold the cross beam supports 206 in proper alignment and position.

FIGS. 9 and 16-18 depict different views of a single top desk system assembly 400 having angled leg support 408. The single top desk system assembly 400 comprises a top panel assembly 402 and two leg supports 408. The method of assembling the assembly 400 may be similar to the methods discussed above. The single top desk system assembly 400 with angled leg support 408 comprises top panel clamp assemblies 404, cross beam support 406, cross beam support covers 414, leg clamp assembly 416, and an accessory rail/channel 418. The single top desk assembly 400, however, utilizes a single cross beam support, rather than the two cross beam supports of the double top desk assemblies discussed above. The accessory rail/channel 418 can be configured to receive and accept an accessory basket in a friction fit, snap fit, or with another fastening method or apparatus. The accessory rail/channel 418 can be further configured to secure cables and other ancillary items that the desk user may wish to attach.

Figure 16:
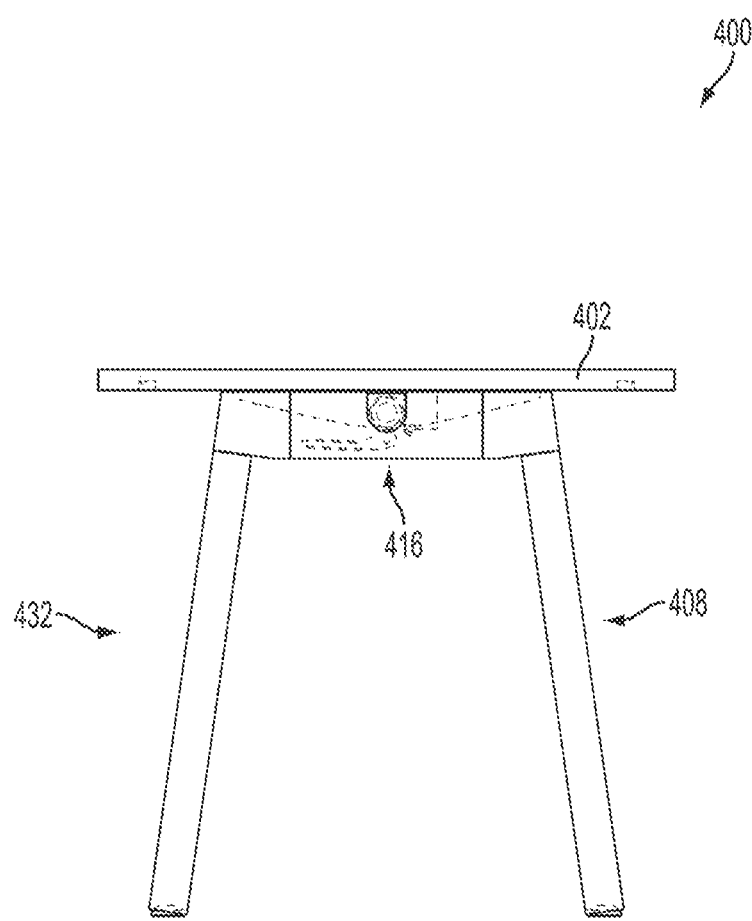
FIG. 16 illustrates a front view of the single top desk depicted in FIG. 9 having another example of a leg clamp assembly.
Figure 17:
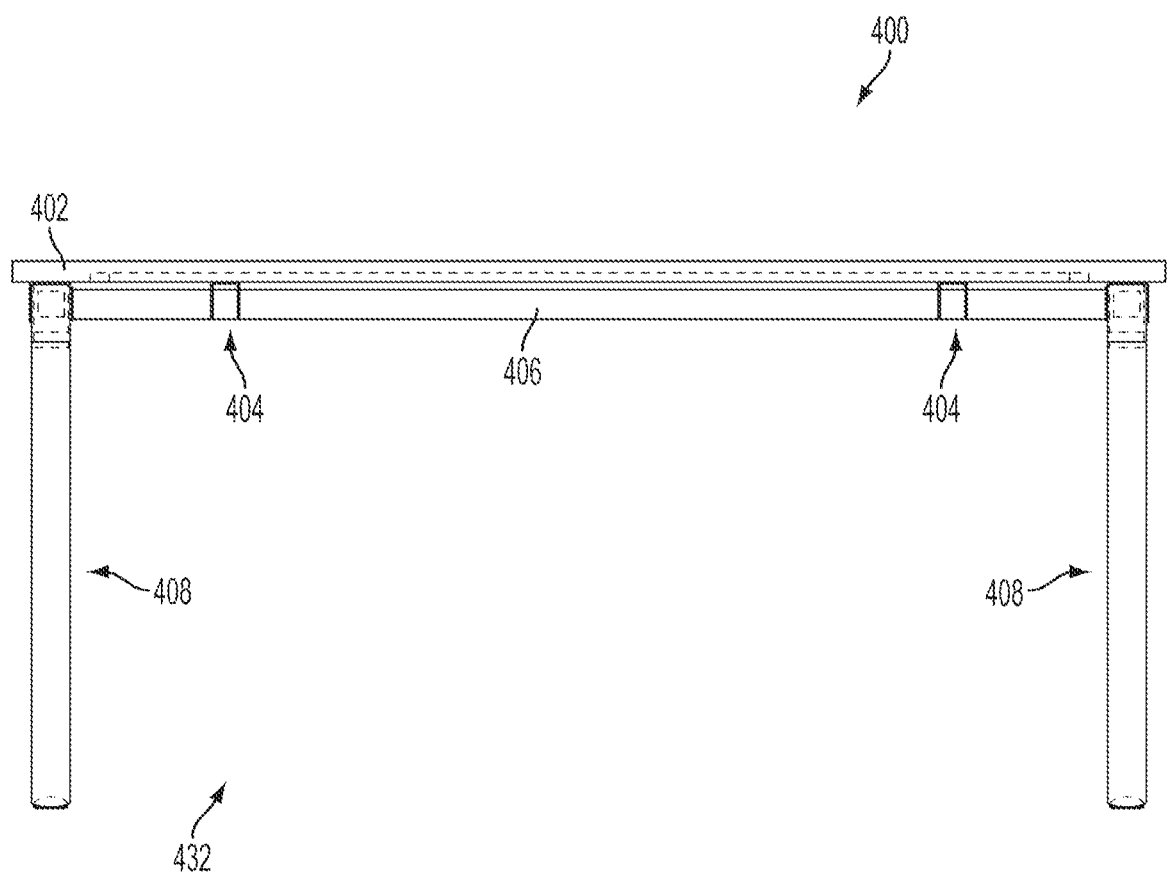
FIG. 17 illustrates a side view of the single top desk depicted in FIG. 9.
Figure 18:
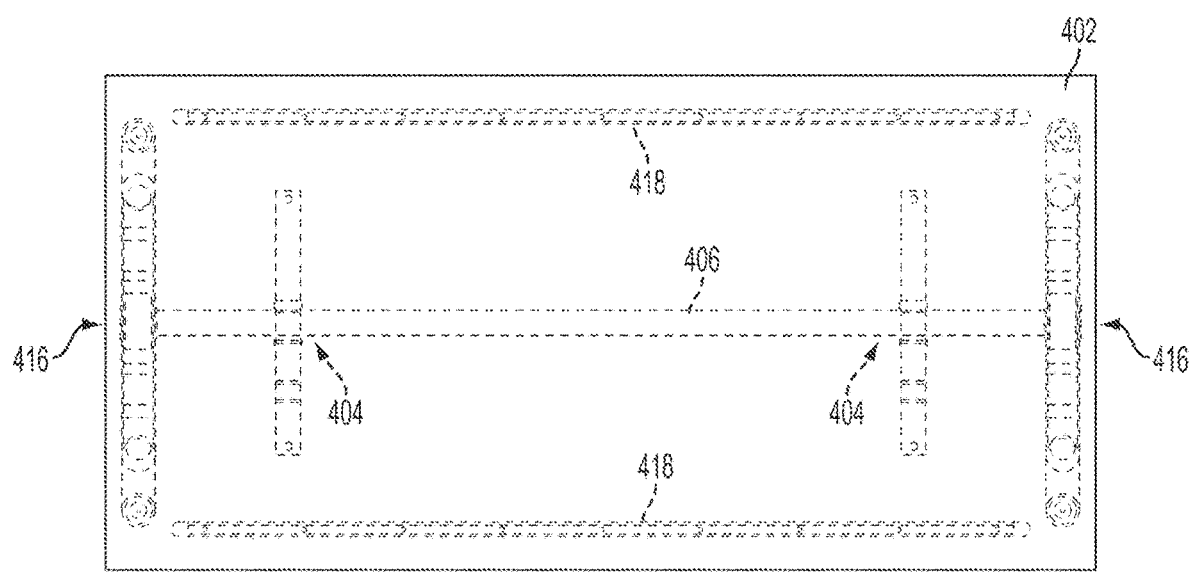
FIG. 18 illustrates a bottom view of the single top desk depicted in FIG. 9.

FIG. 16 depicts an example of a leg clamp assembly 416. The leg clamp assembly 416 employs a camming mechanism to cam a secondary member into a camming relationship with the cross beam supports to hold the cross beam supports 406 in proper alignment and position.

Figure 19:
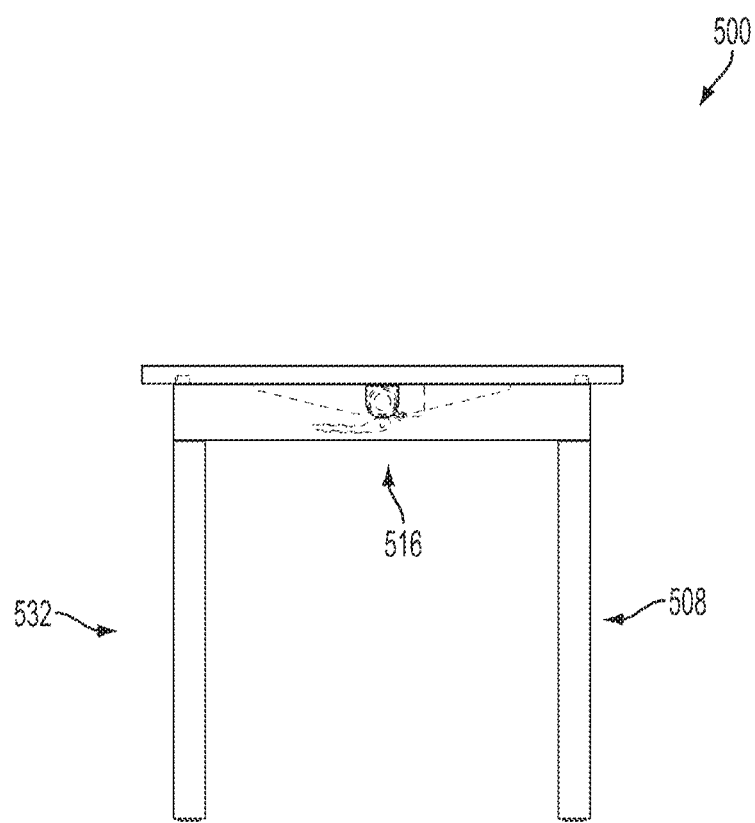
FIG. 19 illustrates a front view of an example of a single top desk having vertical legs having an example of a leg clamp assembly.
Figure 20:
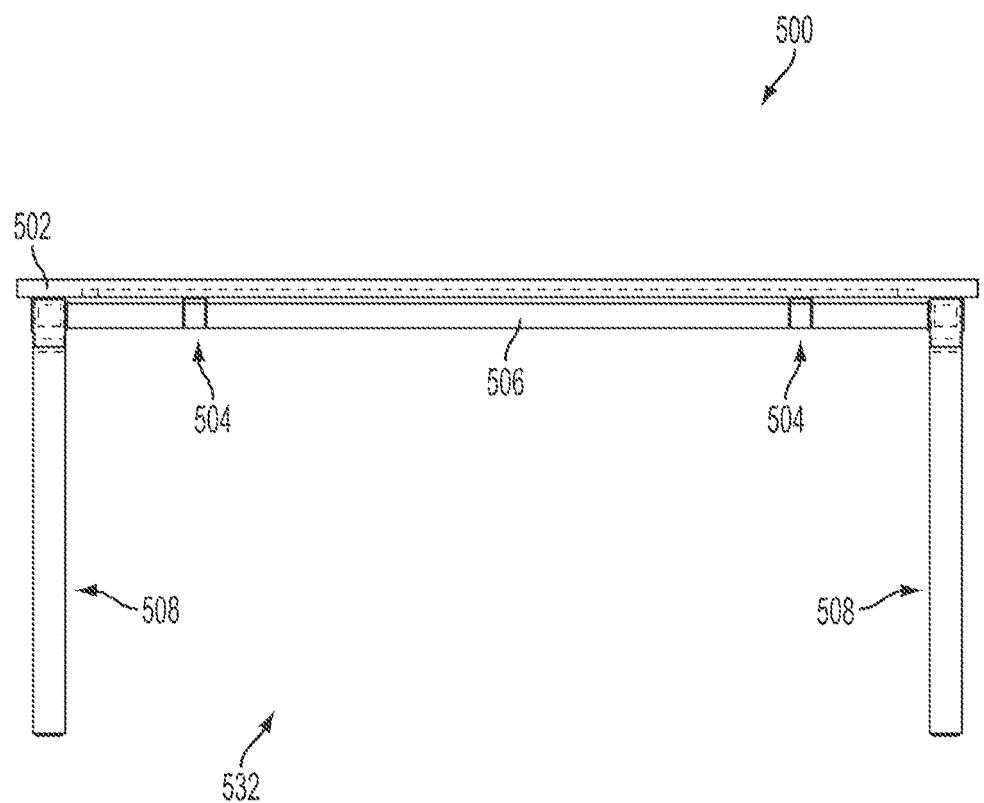
FIG. 20 illustrates a side view of a single top desk having vertical legs as depicted in FIG. 19.
Figure 21:
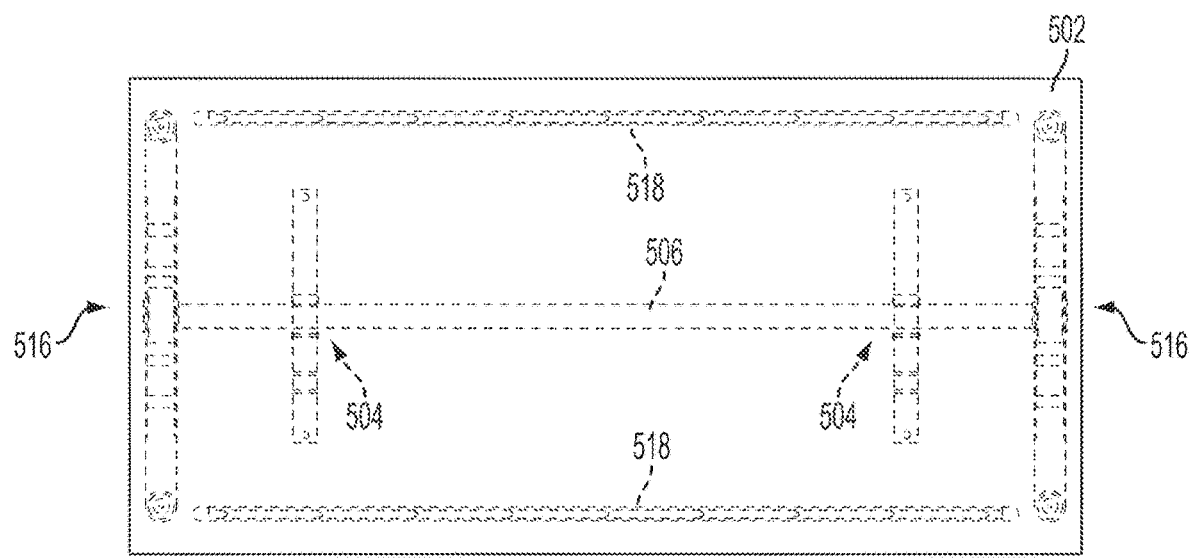
FIG. 21 illustrates a bottom view of a single top desk having vertical legs as depicted in FIG. 19.
Figure 22:
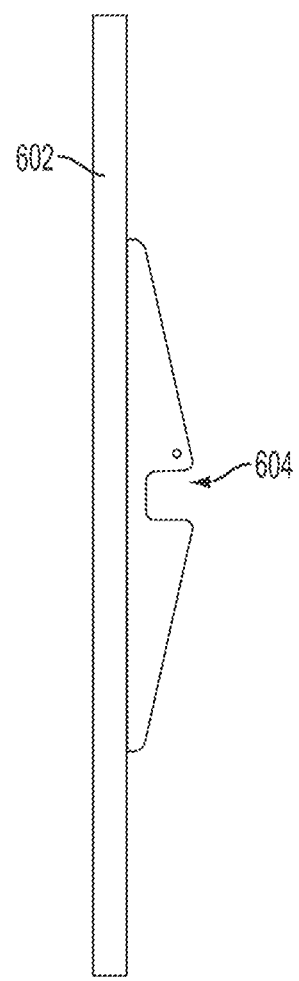
FIG. 22 illustrates a front view of an example of a single top panel assembly.

FIGS. 19-21 depict different views of a single top desk system assembly 500 having vertical leg support 508. The single top desk system assembly 500 comprises a top panel assembly 502 and two vertical leg supports 508. The method of assembling the assembly 500 is similar to the methods discussed above. The assembly 500 with vertical leg support 508 comprises top panel clamp assemblies 504, a cross beam support 506, cross beam support covers 514, leg clamp assembly 516, and an accessory rail/channel 518. The single top desk assembly 500, however, utilizes a single cross beam support, rather than the two cross beam supports of the double top desk assemblies discussed above. The accessory rail/channel 518 can be configured to receive and accept an accessory basket in a friction fit, snap fit, or with another fastening method or apparatus. The accessory rail/channel 518 can be further configured to secure cables and other ancillary items that the desk user may wish to attach. The vertical leg configuration provides for unique aesthetics while reducing the footprint of the base support system 532.

FIG. 19 depicts an example of a leg clamp assembly 516. The leg clamp assembly 516 employs a camming mechanism to cam a secondary member into a camming relationship with the cross beam supports to hold the cross beam supports 506 in proper alignment and position.

Figure 23:
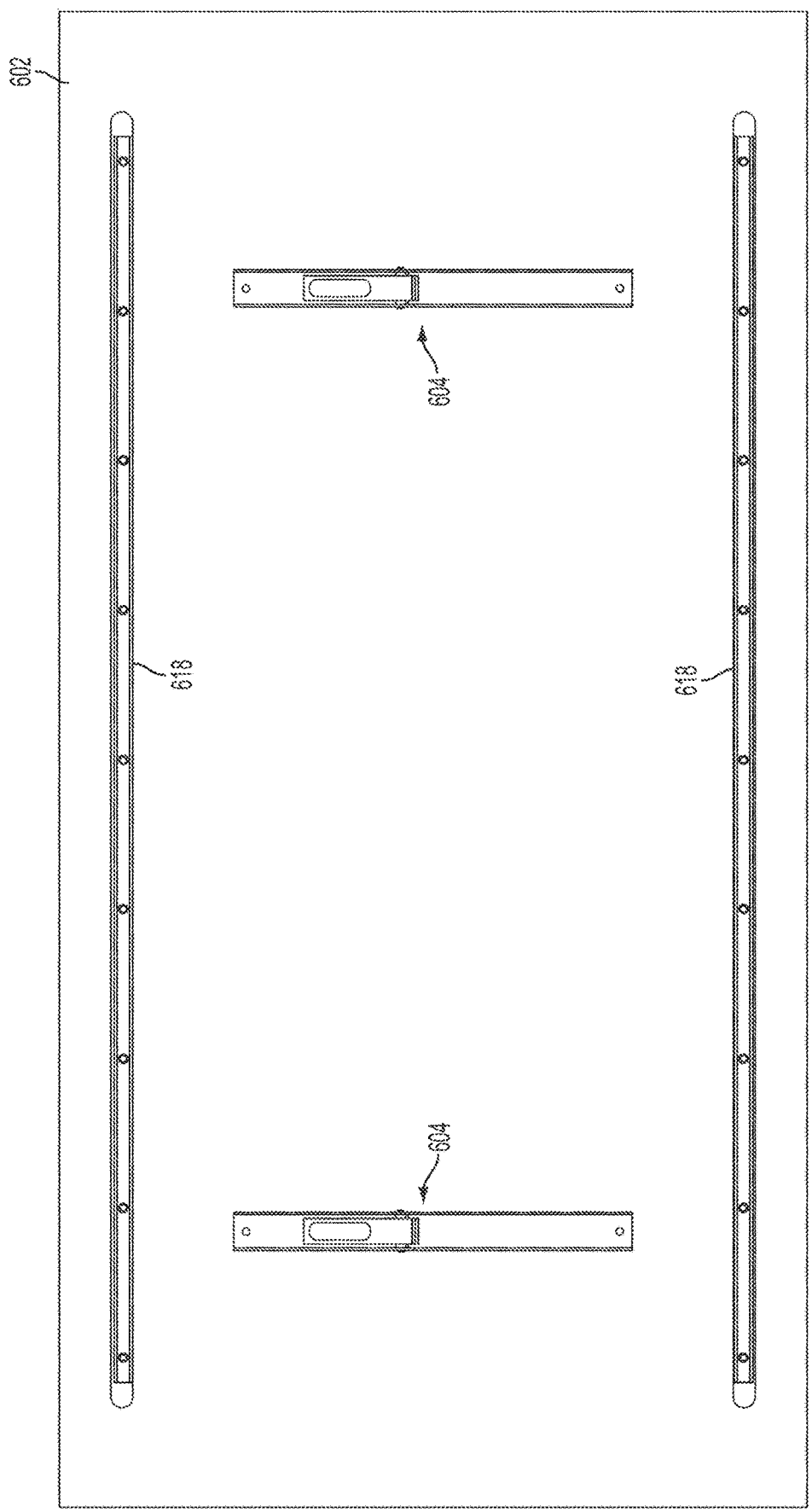
FIG. 23 illustrates a bottom view of the top panel assembly depicted in FIG. 22.

FIGS. 22-27 depict an example of the top panel assembly 602 and the top panel clamp assembly 604. FIG. 23 illustrates the bottom view of the top panel assembly 602 having two accessory rails/channels 618 and two top panel clamp assemblies 604. As shown in FIG. 25, the top panel clamp assembly 604 comprises a top panel clamp lever 620 having a top panel clamp lever camming member 622.

The top panel clamp assembly 604 further includes an aperture 626 configured to accept the cross beam assembly (106, 206, etc.) and securely attach the top panel assembly 602 to the base support system (e.g., 132, 232, etc.). When the top panel clamp lever 620 is in the open position, the camming member 622 is in a recessed position to permit the aperture 626 to accept the cross beam assembly 606. Once the top panel assembly 602 is positioned in place and the cross beam assembly 606 is positioned within the aperture 626, then the top panel clamp lever 620 can be moved to the closed position. In moving the top panel clamp lever 620 to the closed position, the camming member 622 is cammed into camming engagement with the cross beam support 606. When in the closed position, the top panel clamp lever camming member 622 fixably engages the cross beam support 606 and secures the top panel assembly 602 to the base support system (e.g., 132, 232, etc.).

When it is desired to disassemble the desk system assembly 600, the top panel clamp lever 620 can be moved from the closed position to the open position to permit the top panel clamp assembly 604 to release the cross beam support 606 and allow the user to remove the top panel assembly 604 form the base support system (e.g., 132, 232, etc.).

The top panel clamp assembly 604 comprises a unique clamping and camming mechanism. The top panel clamp lever 620 comprises a unique eccentric camming portion around a rotational pivot. The eccentric camming portion permits the top panel clamp lever 620 to engage the camming member 622 as it is moved from an open position to a closed position. As the top panel clamp lever 620 is moved from the open position to the closed position, the eccentric camming portion engages the camming member 622 to rotate the camming member 622 into the aperture 626 to engage the cross beam support 606. As the camming member 622 is rotated into the aperture 626, the camming member 622 cammingly engages the cross beam support 606. The cross beam support 606 is then fixably engaged by the camming member 622 and a portion of the aperture 626 opposite the camming member 622/cross beam support 606 engagement interface.

This unique clamping and camming mechanism provides numerous advantages over existing clamping mechanisms. For example, the top panel clamp assembly creates a unique mechanical advantage and provides the user with an easily actuatable lever. This allows for easier assembly of the desk system assembly and adds to the overall functionality of the design. In addition, the unique clamping and camming mechanism provides for a reduced number of moving parts which increase the design's reliability as well as reduces manufacturing costs. Also, the unique clamping and camming mechanism allows the desk assembly to be assembled without the need for additional tools.

Figure 28:
FIG. 28 illustrates a side view of an example of a cross beam support of a base support system.
Figure 30:
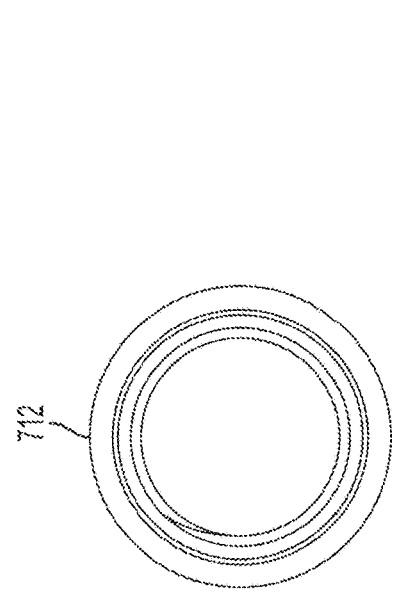
FIG. 30 illustrates a front view of the cross beam spacer of the cross beam spacer connection mechanism depicted in FIG. 9.
Figure 29:
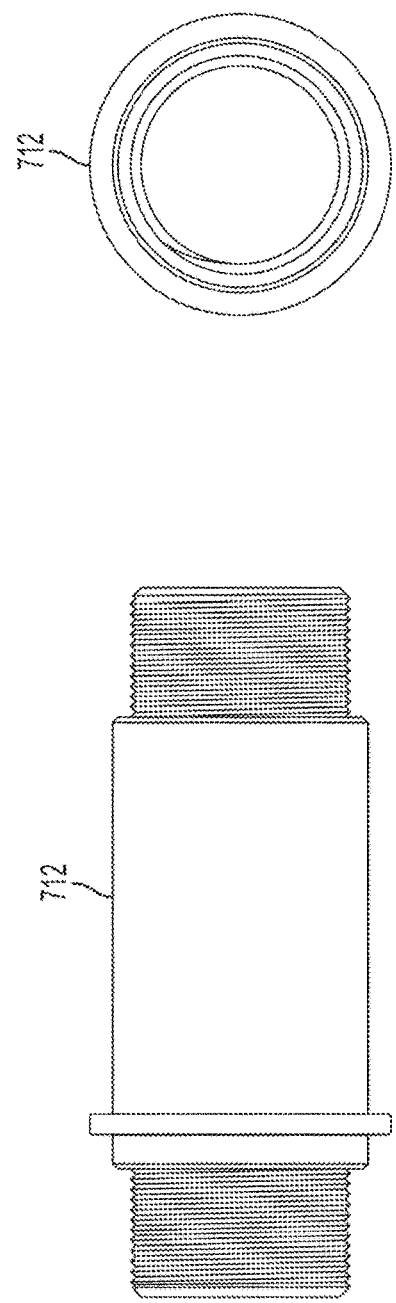
FIG. 29 illustrates a side view of an example of a cross beam spacer of a cross beam support connection mechanism.

FIGS. 28-30 depict a cross beam support 706 and a top beam spacer 712. While many means for connection are envisioned, one embodiment of the present invention provides a top beam spacer 712 having a threaded connection to permit the top beam spacer 712 to be threadedly attached to the cross beam support 706. The top beam spacer 712 may be used to extend the desk system assembly to comprise multiple top panel assemblies along the longitudinal axis extending parallel to the cross beam support 706. The cross beam spacer 712 can be threadedly attached to two cross beam supports extending the longitudinal length of the desk system assembly, as shown in FIGS. 1-7, for example.

Figure 31:
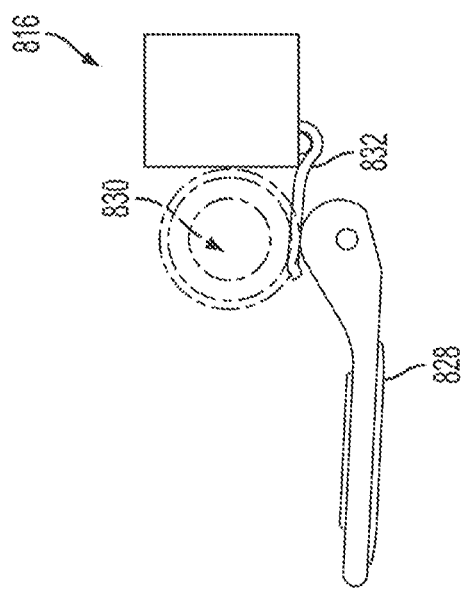
FIG. 31 depicts a front view of an example of a closed leg clamp assembly of a cross beam support connection mechanism.
Figure 32:
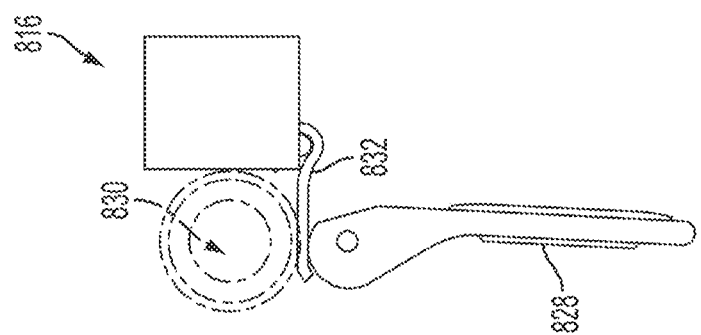
FIG. 32 depicts a front view of an open leg clamp assembly of the cross beam support connection mechanism depicted in FIG. 31; and, FIG. 33 depicts a front view of an example of a double top desk depicting two cross beam support connection mechanisms.
Figure 33:
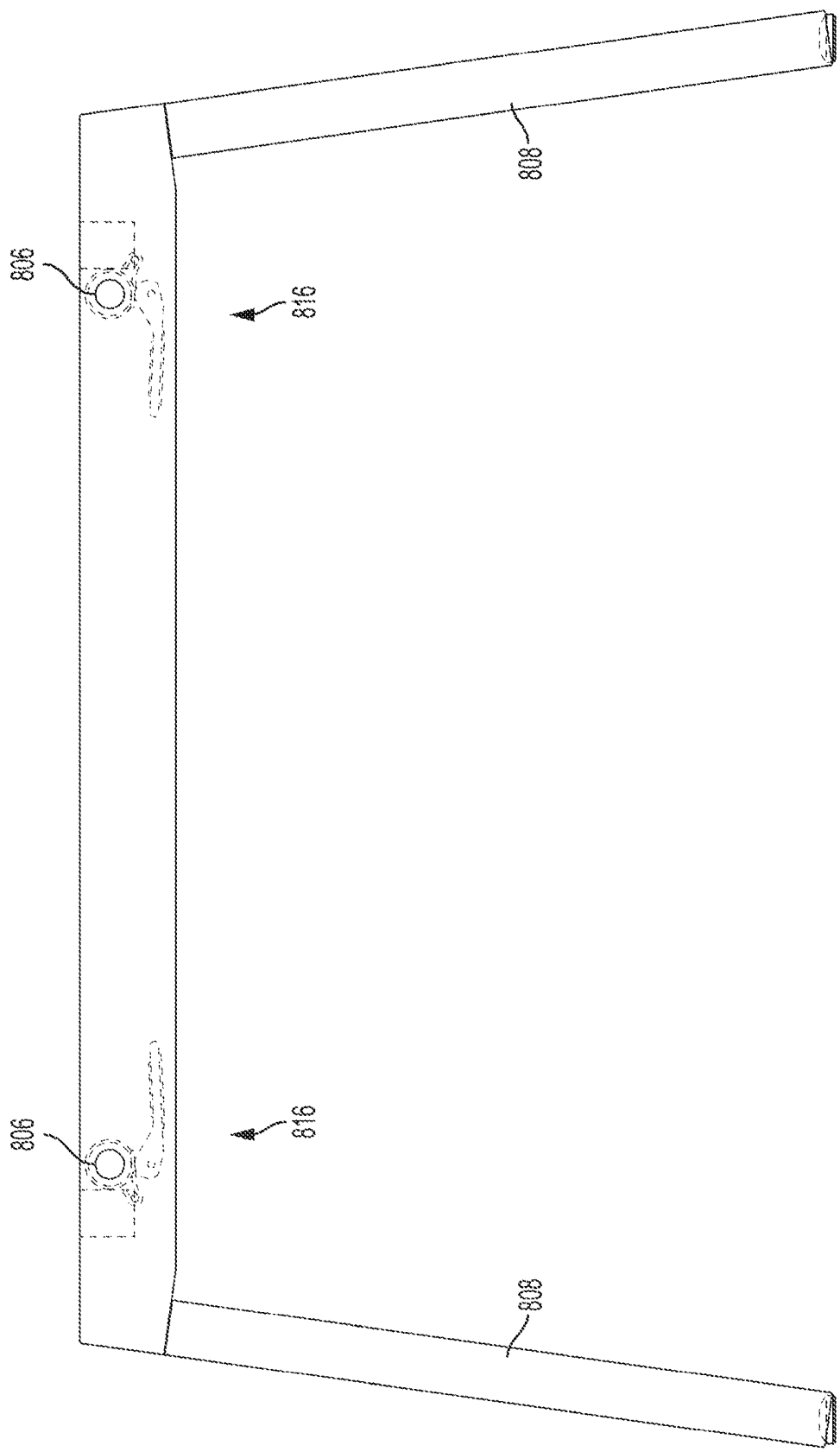

FIGS. 31-33 depict an example of a leg clamp assembly 816. The leg clamp assembly 816 comprises a leg clamp lever 828, a leg clamp aperture 830, and a leg clamp camming member 832. When the leg clamp lever 828 is in the open position, the leg clamp camming member 832 is in a disengaged position which permits the leg clamp assembly to accept has the cross beam support 706 and/or the cross beam spacer 712. During assembly of the base support system (e.g., 132, 232, etc.), the leg clamp lever 828 is in the open position permitting the cross beam support 706 or the cross beam spacer 712 to be inserted into the leg support assembly 808. Once the cross beam support 806 is in position within the leg clamp assembly 816, the leg clamp lever 828 is moved from the open position to the closed position, wherein the leg clamp camming member 832 is cammed into camming engagement with the cross beam support 806 and/or the cross beam spacer 812 to permit the leg clamp assembly 816 to cammingly engage and clamp the cross beam support 806. Once the cross beam supports 806 are cammingly engaged clamped with the leg support 808, the base support system (e.g., 132, 232, etc.) can receive the top panel assembly (e.g., 102, 202, etc.) for attachment to assemble the desk system assembly (e.g., 100, 200, etc.).

The leg clamp assembly 816 comprises a unique clamping and camming mechanism. The leg clamp assembly 816 comprises a unique eccentric camming portion around a rotational pivot. The eccentric camming portion permits the leg clamp assembly 816 to engage the leg clamp camming member 832 as it is moved from an open position to a closed position. As the leg clamp assembly 816 is moved from the open position to the closed position, the eccentric camming portion engages the leg clamp camming member 832 to rotate the leg clamp camming member 832 into the leg clamp aperture 830 to engage the cross beam support 806. As the leg clamp camming member 832 is rotated into the leg clamp aperture 830, the leg clamp camming member 832 cammingly engages the cross beam support 806. The cross beam support 806 is then fixably engaged by the leg clamp camming member 832 and a portion of the leg clamp aperture 830 opposite the leg clamp camming member 832/cross beam support 806 engagement interface.

This unique clamping and camming mechanism provides numerous advantages over existing clamping mechanisms. For example, the top panel clamp assembly creates a unique mechanical advantage and provides the user with an easily actuatable lever. This allows for easier assembly of the desk system assembly and adds to the overall functionality of the design. In addition, the unique clamping and camming mechanism provides for a reduced number of moving parts which increase the design's reliability as well as reduces manufacturing costs. Also, the unique clamping and camming mechanism allows the desk assembly to be assembled without the need for additional tools.

It can be appreciated that the desk system assembly structured in accordance with certain embodiments of the invention can be structured to accommodate the functional requirements of the user and workspace. For example, multiple base support systems can be interconnected to provide support for a larger top panel assembly. In one embodiment, the top panel assembly may overlay at least two base support systems to provide a conference table configuration. The conference table top may be of various sizes to optimize the user's space. In addition to the horizontal multifunctionality, the desk system can also be adapted vertically through the addition of leg height adjustments. For example, the desk system can be raised or lowered to meet the operational functionality desired, such as a standing desk or bar tables.

It will also be appreciated that the desk systems may incorporate numerous accessories to allow the user to further customize the desk system. For example, the desk system may incorporate dividers to create numerous workspaces from a single desk system. Other embodiments, for example, may include screen panels, shelves, hooks and storage accessories to permit further customization and optimization of the workspace.

It will also be appreciated that other top panel assembly embodiments may be incorporated into the base systems. For example, top panel assemblies having angular configurations, such as 45 degrees, 90 degrees, 120 degrees, etc. to provide optimization and utilization of the workspace. In addition to various top panel assemblies, the base support systems may incorporate additional support structures, such as loop legs to provide additional support and stability of the desk system. Other variations include, but are not limited to, stackable and multilevel top panel assemblies, slibable and rotatable top panel assemblies, and raisable and lowerable top panel assemblies.

It can be appreciated that a desk system assembly structured in accordance with certain embodiments of the invention can be made to appear aesthetically pleasing either when used as a single, double or multiple top panel assembly configurations. The desk system assembly can be readily converted and used to perform different activities or to serve multiple purposes. The desk system assembly can be structured with a design which is sleek and clean without showing the detailed mechanisms that enable the ease of assembly. In addition, as evidenced by the assembly method described above, embodiments of the desk support system can be readily packaged for storage, shipment, and/or assembly. For example, multiple pieces of the desk support system can be packaged in a substantially flat container, which enhances the unassembled desk support system to be conveniently stored, shipped, and then unpacked at a later time.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, those skilled in the art will appreciate that the fasteners described herein (e.g., screws) may be replaced or supplemented by other suitable fastening means including a variety of other types of mechanical fastening devices (e.g., nails, rivets, magnets, or others). In another example, a particular choice of construction material (e.g., aluminum, plastic, steel, etc.) may be replaced or supplemented by another type of material which is suitable for the same or similar structure or function.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. It will be appreciated that, for convenience and clarity of disclosure, terms describing relative orientation or spatial positioning such as "proximal," "distal," "vertical," "horizontal," "up," "down," "top," "front," "back," "bottom," "upward," or "downward" may be used at times herein with respect to the drawings and text description in association with various embodiments of the invention. However, such terms are primarily used for illustrative purposes and are not necessarily intended to be limiting in nature.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art. For example, there may be variations to these diagrams or the operations described herein without departing from the spirit of the invention.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as claimed.

What is claimed is:

1. A kit, comprising:
    a tabletop comprising a clamping assembly mounted to an underside of the tabletop, wherein the clamping assembly defines an opening, and wherein the clamping assembly comprises:
        a lever rotatable between a first position and a second position, wherein the lever comprises a camming surface; and
        a clamp operably engaged with the lever; and
    a support member positionable in the opening, wherein the camming surface is configured to move the clamp into clamping engagement with the support member positioned in the opening to fixedly secure the support member within the opening upon rotation of the lever from the first position to the second position.

2. The kit of claim 1, wherein the support member comprises a trestle cross beam configured to support the tabletop.

3. The kit of claim 1, wherein the support member comprises a threaded connection.

4. The kit of claim 3, further comprising a first cross beam and a second cross beam connected end-to-end by the threaded connection.

5. The kit of claim 4, wherein the first cross beam comprises a first end comprising internal threads, wherein the second cross beam comprises a second end comprising internal threads, and wherein the threaded connection is structured to threadably engage the internal threads of the first end and the second end.

6. The kit of claim 4, further comprising a second tabletop comprising a second clamping assembly mounted to an underside of the second tabletop, wherein the second clamping assembly defines a second opening, and wherein the second clamping assembly comprises:
    a second lever rotatable between a first position and a second position, wherein the second lever comprises a second camming surface; and
    a second clamp operably engaged with the second lever;
    wherein the first cross beam is positionable in the second opening, wherein the second camming surface is configured to move the second clamp into clamping engagement with the first cross beam positioned in the second opening to fixedly secure the first cross beam within the second opening upon rotation of the second lever from the first position to the second position.

7. A kit, comprising:
    a tabletop comprising a clamping assembly mounted to an underside of the tabletop, wherein the clamping assembly defines an opening, and wherein the clamping assembly comprises:
        a lever rotatable between a first position and a second position, wherein the lever comprises a camming surface; and
        a clamp operably engaged with the lever; and
    a threaded connector, comprising:
        a first end comprising threads; and
        a second end comprising threads;
    wherein the threaded connector is positionable in the opening, and wherein the camming surface is configured to move the clamp into clamping engagement with the threaded connector positioned in the opening to fixedly secure the threaded connector to the tabletop upon rotation of the lever from the first position to the second position.

8. The kit of claim 7, further comprising a first cross beam and a second cross beam connected end-to-end by the threaded connector.

9. The kit of claim 8, wherein the first cross beam comprises a first end comprising internal threads, wherein the second cross beam comprises a second end comprising internal threads, and wherein the threaded connector is structured to threadably engage the internal threads of the first end and the second end.

10. The kit of claim 7, further comprising a first cross beam comprising a first end and a second end, wherein the first end is threadably connected to the threaded connector, wherein the tabletop further comprises a second clamping assembly mounted to an underside of the tabletop, wherein the second clamping assembly defines a second opening, and wherein the second clamping assembly comprises:
a second lever rotatable between a first position and a second position, wherein the second lever comprises a second camming surface; and
a second clamp operably engaged with the second lever;
wherein the second end of the first cross beam is positionable in the second opening, wherein the second camming surface is configured to move the second clamp into clamping engagement with the second end positioned in the second opening to fixedly secure the first cross beam to the tabletop upon rotation of the second lever from the first position to the second position.

11. The kit of claim 10, further comprising:
a second cross beam comprising a first end and a second end, wherein the first end of the second cross beam is threadably connected to the threaded connector; and
a second tabletop comprising a third clamping assembly mounted to an underside of the second tabletop, wherein the third clamping assembly defines a third opening, and wherein the third clamping assembly comprises:
a third lever rotatable between a first position and a second position, wherein the third lever comprises a third camming surface; and
a third clamp operably engaged with the third lever;
wherein the second end of the second cross beam is positionable in the third opening, wherein the third camming surface is configured to move the third clamp into clamping engagement with the second end of the second cross beam positioned in the third opening to fixedly secure the second cross beam to the second tabletop upon rotation of the third lever from the first position to the second position.

12. The kit of claim 11, wherein a rotation of the third lever from the second position to the first position is configured to disengage the second end of the second cross beam from the third clamping assembly to release the second cross beam from the second tabletop.

13. An assembly, comprising:
a threaded connector; and
a clamping assembly defining an opening configured to accept the threaded connector, wherein the clamping assembly comprises:
a lever comprising a camming portion, the lever rotatable between a first position and a second position; and
a camming member operably engaged with the camming portion, the camming member comprising a first end and a second end;
wherein a rotation of the lever from the first position to the second position is configured to pivot the second end of the camming member relative to the first end and move the second end into engagement with the threaded connector positioned in the opening to fixedly secure the threaded connector to the clamping assembly.

14. The assembly of claim 13, wherein the opening is unobstructed by the camming member when the lever is in the first position such that the opening can receive the threaded connector therein.

15. The assembly of claim 13, wherein the second end is configured to frictionally engage the threaded connector positioned through the opening when the lever is in the second position.

16. The assembly of claim 13, wherein a rotation of the lever from the second position to the first position is configured to disengage the second end from the threaded connector to release the threaded connector from the clamping assembly.

17. The assembly of claim 13, wherein the lever is connected to a shaft about which the lever rotates between the first position and the second position.

18. The assembly of claim 17, wherein the shaft is fixed in place.

19. The assembly of claim 13, wherein the threaded connector is configured to connect a pair of furniture support beams end-to-end.

20. The assembly of claim 19, wherein the pair of furniture support beams are configured to support at least one tabletop.

* * * * *